US011659151B2

(12) United States Patent
Aflaki et al.

(10) Patent No.: US 11,659,151 B2
(45) Date of Patent: May 23, 2023

(54) APPARATUS, A METHOD AND A COMPUTER PROGRAM FOR VOLUMETRIC VIDEO

(71) Applicant: Nokia Technologies Oy, Espoo (FI)

(72) Inventors: Payman Aflaki, Tampere (FI); Sebastian Schwarz, Unterhaching (DE)

(73) Assignee: Nokia Technologies Oy, Espoo (FI)

( * ) Notice: Subject to any disclaimer, the term of this patent is extended or adjusted under 35 U.S.C. 154(b) by 173 days.

(21) Appl. No.: 16/857,838

(22) Filed: Apr. 24, 2020

(65) Prior Publication Data
US 2020/0351484 A1 Nov. 5, 2020

(30) Foreign Application Priority Data

Apr. 30, 2019 (FI) ...................................... 20195351

(51) Int. Cl.
 *H04N 13/161* (2018.01)
 *G06T 7/11* (2017.01)
 (Continued)

(52) U.S. Cl.
 CPC ............ *H04N 13/161* (2018.05); *G06T 7/11* (2017.01); *G06T 7/41* (2017.01); *H04N 13/388* (2018.05); *H04N 19/46* (2014.11); *H04N 19/597* (2014.11)

(58) Field of Classification Search
 CPC ...... H04N 19/597; H04N 19/70; H04N 19/44; H04N 19/136; H04N 19/167;
 (Continued)

(56) References Cited

U.S. PATENT DOCUMENTS

| 7,003,136 B1 | 2/2006 | Harville |
| 2006/0227137 A1 | 10/2006 | Weyrich et al. |

(Continued)

FOREIGN PATENT DOCUMENTS

| CN | 109076255 A | 12/2018 |
| WO | 2016/025980 A1 | 2/2016 |
| WO | 2019/012067 A1 | 1/2019 |

OTHER PUBLICATIONS

Schwarz S, Preda M, Baroncini V, Budagavi M, Cesar P, Chou PA, Cohen RA, Krivokuća M, Lasserre S, Li Z, Llach J. Emerging MPEG standards for point cloud compression. IEEE Journal on Emerging and Selected Topics in Circuits and Systems. Dec. 10, 2018;9(1):133-48. (Year: 2018).*

(Continued)

*Primary Examiner* — Xiao M Wu
*Assistant Examiner* — Scott E Sonners
(74) *Attorney, Agent, or Firm* — Joseph C. Drish; Harrington & Smith

(57) ABSTRACT

There are disclosed various methods, apparatuses and computer program products for volumetric video encoding and decoding. In some embodiments of a method for encoding, one or more patches comprising information of a three-dimensional scene are obtained. An attribute parameter set is formed on the basis of visual properties of a surface of an object in the three-dimensional scene. Also an indication that the attribute parameter set relates to visual properties of the surface of the object and an indication on a range for which the attribute parameter set is valid.

24 Claims, 15 Drawing Sheets

(51) Int. Cl.
  *G06T 7/41* (2017.01)
  *H04N 13/388* (2018.01)
  *H04N 19/46* (2014.01)
  *H04N 19/597* (2014.01)

(58) Field of Classification Search
  CPC .... H04N 19/182; H04N 19/20; H04N 13/161; G06T 9/001; G06T 9/00; G06T 2207/10028; G06T 5/002; G06T 15/00; G06T 2207/20016; G06T 7/11
  See application file for complete search history.

(56) References Cited

U.S. PATENT DOCUMENTS

| | | | | |
|---|---|---|---|---|
| 2017/0347122 | A1* | 11/2017 | Chou | G06T 9/00 |
| 2018/0047208 | A1 | 2/2018 | Marin et al. | |
| 2019/0028691 | A1* | 1/2019 | Hinds | H04N 21/4518 |
| 2021/0358176 | A1* | 11/2021 | Kuma | G06T 9/001 |

OTHER PUBLICATIONS

Nan et al., "2D-3D lifting for Shape Reconstruction", Eurographics Association, vol. 33, No. 7, 2014, 10 pages.
"Information Technology—Dynamic Adaptive Streaming Over HTTP (DASH)—Part 1: Media Presentation Description and Segment Formats", ISO/IEC 23009-1, May 15, 2014, 152 pages.
Office action received for corresponding Finnish Patent Application No. 20195351, dated Nov. 29, 2019, 9 pages.
"Information technology—Coded Representation of Immersive Media—Part 5: Video-based Point Cloud Compression", ISO/IEC JTC 1/SC 29/WG 11, ISO/IEC 23090-5, 2019, 103 pages.
"PCC TMC2 Patch Material & Functionality Signaling", Nokia Technologies, ISO/IEC JTC1/SC29/VVG11 MPEG2018/m43730, Jul. 2018, 4 pages.
"V-PCC Codec Description", 3DG, ISO/IEC JTC1/SC29/WG11 MPEG2019/N18190, Jan. 2019, 39 pages.
Extended European Search Report received for corresponding European Patent Application No. 20169243.1, dated Sep. 28, 2020, 9 pages.
Schwarz et al., "Emerging MPEG Standards for Point Cloud Compression", IEEE Journal on Emerging and Selected Topics in Circuits and Systems, vol. 9, No. 1, Mar. 2019, pp. 133-148.
"V-PCC on Attribute Coding (CE2.15)", Nokia, ISO/IEC JTC1/SC29/WG11 MPEG2018/ m44735, Oct. 2018, 10 pages.
"[V-PCC] CE2.15 material attribute coding", Technicolor, ISO/IEC JTC1/SC29/WG11 MPEG2018/m46090, Jan. 2019, 1 page.
Hadwiger et al., "Course Notes: Advanced Illumination Techniques for GPU-Based vol. Raycasting", ACM SIGGRAPH, Article No. 2, Aug. 2009, 166 pages.

* cited by examiner

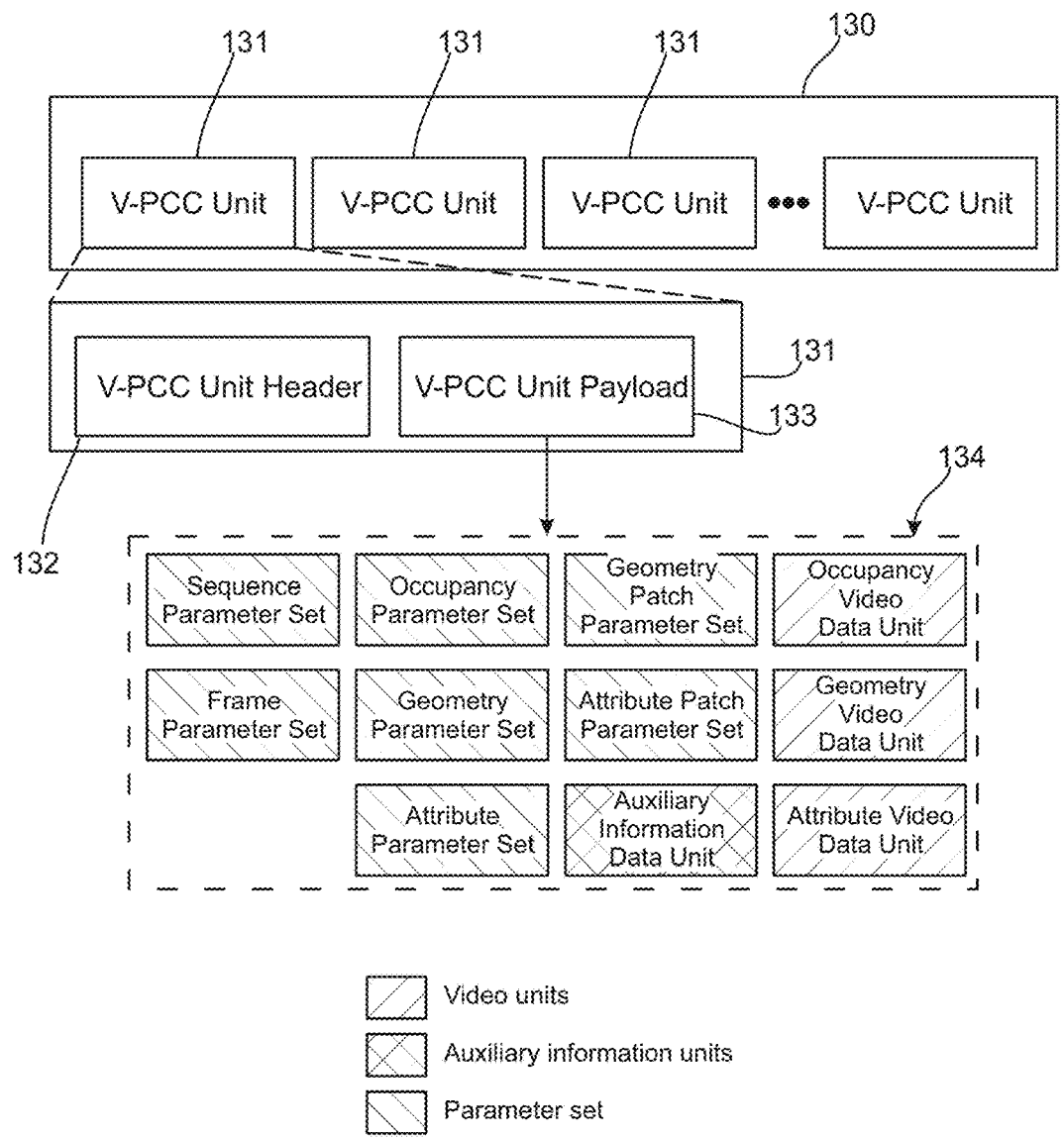
Fig. 13
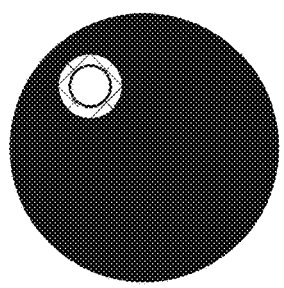 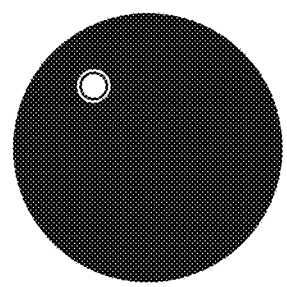 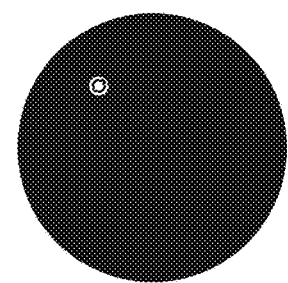
Fig. 14a    Fig. 14b    Fig. 14c

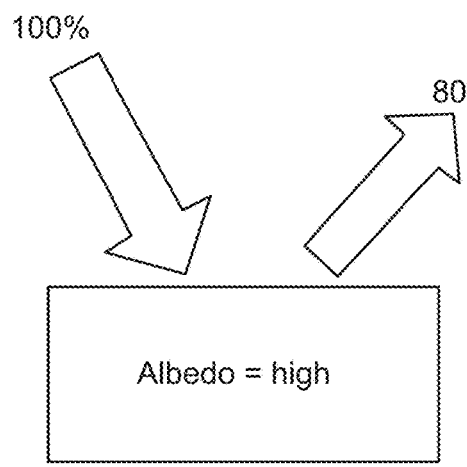
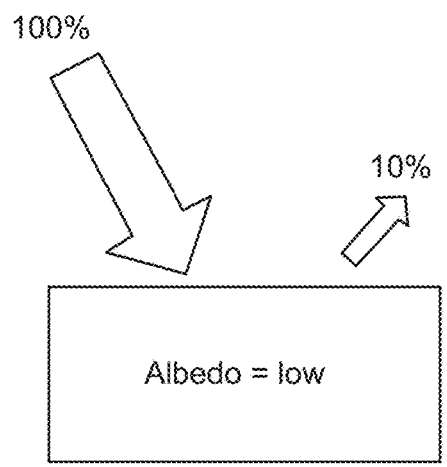
Fig. 15a    Fig. 15b
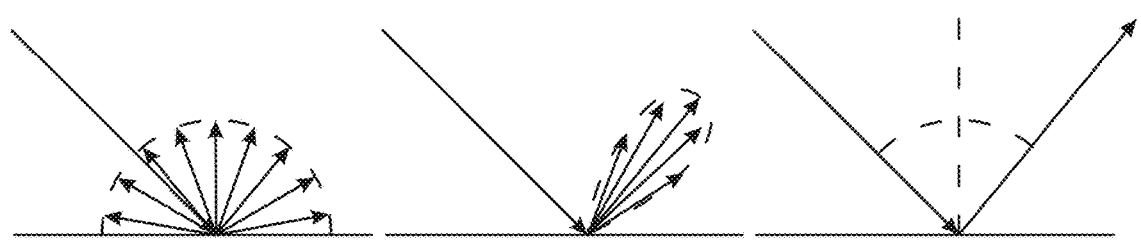
Fig. 16a    Fig. 16b    Fig. 16c
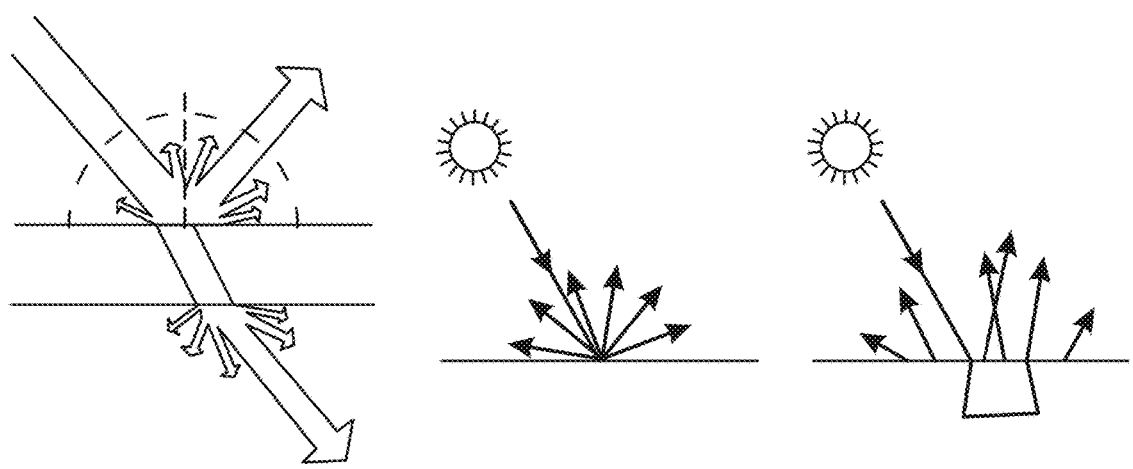
Fig. 17a    Fig. 17b    Fig. 17c

APPARATUS, A METHOD AND A COMPUTER PROGRAM FOR VOLUMETRIC VIDEO

TECHNICAL FIELD

The present invention relates to an apparatus, a method and a computer program for volumetric video coding and decoding.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can decompress the compressed video representation back into a viewable form. The encoder may discard some information in the original video sequence in order to represent the video in a more compact form, for example, to enable the storage/transmission of the video information at a lower bitrate than otherwise might be needed.

Volumetric video data represents a three-dimensional scene or object and can be used as input for virtual reality (VR), augmented reality (AR) and mixed reality (MR) applications. Such data describes the geometry attribute, e.g. shape, size, position in three-dimensional (3D) space, and respective attributes, e.g. colour, opacity, reflectance and any possible temporal changes of the geometry attribute and other attributes at given time instances. Volumetric video is either generated from 3D models through computer-generated imagery (CGI), or captured from real-world scenes using a variety of capture solutions, e.g. multi-camera, laser scan, combination of video and dedicated depth sensors, and more. Also, a combination of CGI and real-world data is possible.

Typical representation formats for such volumetric data are triangle meshes, point louds (PCs), or voxel arrays. Temporal information about the scene can be included in the form of individual capture instances, i.e. "frames" in 2D video, or other means, e.g. position of an object as a function of time.

An image generation process exploits the 3D to 2D mapping computed during the packing process to store the geometry and texture of the point cloud as images. In order to better handle the case of multiple points being projected to the same pixel, each patch is projected onto two images, referred to as layers. The patch generation process aims at decomposing the point cloud into a minimum number of patches with smooth boundaries, while also minimizing the reconstruction error. A padding process aims at filling empty spaces between patches in order to generate a piecewise smooth image suited for video compression. A packing process aims at mapping the extracted patches onto a 2D grid. An occupancy map may also be generated which consists of a binary map that indicates for each cell of the grid whether it belongs to the empty space or to the point cloud.

SUMMARY

Now there has been invented an improved method and technical equipment implementing the method, by which e.g. improved reconstruction quality may be obtained without increasing bit rate requirements. Various aspects of the invention include a method, an apparatus (an encoder and/or a decoder), a system and a computer readable medium comprising a computer program or a signal stored therein, which are characterized by what is stated in the independent claims. Various details of the invention are disclosed in the dependent claims and in the corresponding images and description.

Identifying correspondences for motion-compensation in 3D-space may be an ill-defined problem, as both the geometry and respective attributes may change. For example, temporal successive "frames" do not necessarily have the same number of meshes, points or voxel. Therefore, compression of dynamic 3D scenes may be inefficient. 2D-video based approaches for compressing volumetric data, i.e. multiview+depth, may have better compression efficiency, but rarely cover the full scene. Therefore, they provide only limited six degrees of freedom (6DOF) capabilities.

Because volumetric video describes a 3D scene (or object), such data can be viewed from any viewpoint. Therefore, volumetric video may be an important format for any AR, VR, or MR applications, especially for providing 6DOF viewing capabilities.

Increasing computational resources and advances in 3D data acquisition devices has enabled reconstruction of highly detailed volumetric video representations of natural scenes. Infrared, lasers, time-of-flight and structured light are all examples of devices that can be used to construct 3D video data. Representation of the 3D data depends on how the 3D data is used. Dense Voxel arrays have been used to represent volumetric medical data. In 3D graphics, polygonal meshes are extensively used. Point clouds on the other hand are well suited for applications such as capturing real world 3D scenes where the topology is not necessarily a 2D manifold. Another way to represent 3D data is coding this 3D data as set of texture and depth map as is the case in the multi-view plus depth. Closely related to the techniques used in multi-view plus depth is the use of elevation maps, and multi-level surface maps.

In dense point clouds or voxel arrays, the reconstructed 3D scene may contain tens or even hundreds of millions of points. If such representations are to be stored or interchanged between entities, then efficient compression may become essential.

A volumetric video may comprise three-dimensional scenes represented as, for example, dynamic point clouds, arrays of voxels or mesh models or a combination of such. The three-dimensional scenes may be projected onto a number of projection surfaces having simple geometries, for example sphere(s), cylinder(s), cube(s), polyhedron(s) and/or plane(s). A three-dimensional scene contains at least one three-dimensional object. In this context, a projection surface may be a piece-wise continuous and smooth surface in three-dimensional space. Piece-wise smoothness may be understood so that there are regions of the surface where the direction of the surface normal does not change abruptly (i.e. the values of the coefficients of the surface normal's coordinate components are continuous). A projection surface may comprise pieces of simple geometric surfaces. A projection surface may also evolve (change) over time. On such surfaces, the texture and geometry of point clouds, voxel arrays or mesh models may form pixel images, e.g. texture images and depth images (indicative of distance from the projection surface). These two images represent the same object projected onto the same geometry, therefore object boundaries are aligned in texture and depth image.

Such projection surfaces may be unfolded onto two-dimensional (2D) planes, e.g. resulting in a two-dimensional pixel image. Standard 2D video coding may be applied for each projection to code the pixel information resulting from the texture data. In connection with the texture information, relevant projection geometry information (geometry attributes), comprising e.g. projection or projection surface type, location and orientation of the projection surface in 3D space, and/or size of the projection surface, may be transmitted either in the same bitstream or separately along with the bitstream. At the receiver side, the bitstream may be decoded and volumetric video may be reconstructed from decoded 2D projections and projection geometry information.

Two-dimensional images may be projected from different parts of scene objects to form several patches. Such patches may be projections onto one of three orthogonal planes (front, side, top). Patches are derived by analysing surface normals and clustering related 3D data points. The projection plane for each such patch is the one of the above mentioned three planes with the closest surface normal to the average patch normal. All patches may be packed into a 2D grid for compression. For each patch a 3D vector is signaled to specify the patch location in 3D space for reprojection at the decoder side.

Such patches may be gathered together to create a 2D grid which will later be encoded using conventional video codecs.

The phrase along with the bitstream (e.g. indicating along with the bitstream) may be defined to refer to out-of-band transmission, signaling, or storage in a manner that the out-of-band data is associated with the bitstream. The phrase decoding along with the bitstream or alike may refer to decoding the referred out-of-band data (which may be obtained from out-of-band transmission, signaling, or storage) that is associated with the bitstream. For example, an indication along with the bitstream may refer to metadata in a container file that encapsulates the bitstream.

The phrase in the bitstream or into the bitstream may be defined to refer to data transmission, signaling, or storage in a manner that the data is inserted into the bitstream. The phrase decoding from the bitstream or alike may refer to decoding the referred data (which may be obtained from the transmission, signaling, or storage) that is encoded within the bitstream.

Some embodiments provide a method for encoding and decoding volumetric video information. In some embodiments of the present invention there is provided a method, apparatus and computer program product for volumetric video coding as well as decoding.

Various aspects of examples of the invention are provided in the detailed description.

According to a first aspect, there is provided a method comprising:
obtaining one or more patches comprising information of a three-dimensional scene;
forming an attribute parameter set on the basis of visual properties of a surface of an object in the three-dimensional scene;
forming an indication that the attribute parameter set relates to visual properties of the surface of the object; and
forming an indication on a range for which the attribute parameter set is valid.

An apparatus according to a second aspect comprises at least one processor and at least one memory, said at least one memory stored with code thereon, which when executed by said at least one processor, causes the apparatus to perform at least:
obtain one or more patches comprising information of a three-dimensional scene;
form an attribute parameter set on the basis of visual properties of a surface of an object in the three-dimensional scene;
form an indication that the attribute parameter set relates to visual properties of the surface of the object; and
form an indication on a range for which the attribute parameter set is valid.

A computer readable storage medium according to a third aspect comprises code for use by an apparatus, which when executed by a processor, causes the apparatus to perform:
obtain one or more patches comprising information of a three-dimensional scene;
form an attribute parameter set on the basis of visual properties of a surface of an object in the three-dimensional scene;
form an indication that the attribute parameter set relates to visual properties of the surface of the object; and
form an indication on a range for which the attribute parameter set is valid.

An apparatus according to a fourth aspect comprises means for:
obtaining one or more patches comprising information of a three-dimensional scene;
forming an attribute parameter set on the basis of visual properties of a surface of an object in the three-dimensional scene;
forming an indication that the attribute parameter set relates to visual properties of the surface of the object; and
forming an indication on a range for which the attribute parameter set is valid.

An apparatus according to a fifth aspect comprises:
a first circuitry configured to obtain one or more patches comprising information of a three-dimensional scene;
a second circuitry configured to form an attribute parameter set on the basis of visual properties of a surface of an object in the three-dimensional scene;
a third circuitry configured to form an indication that the attribute parameter set relates to visual properties of the surface of the object; and
a fourth circuitry configured to form an indication on a range for which the attribute parameter set is valid.

According to a sixth aspect, there is provided a method comprising:
receiving an information element carrying an attribute parameter set, which relates to one or more patches comprising information of a three-dimensional scene;
examining an indication to determine whether the attribute parameter set has been formed on the basis of visual properties of a surface of an object in the three-dimensional scene;
if the examination reveals that the attribute parameter set has been formed on the basis of visual properties of the surface of the object, using the attribute parameter set to reconstruct the three-dimensional scene.

An apparatus according to a seventh aspect comprises at least one processor and at least one memory, said at least one memory stored with code thereon, which when executed by said at least one processor, causes the apparatus to perform at least:
receive an information element carrying an attribute parameter set, which relates to one or more patches comprising information of a three-dimensional scene;

examine an indication to determine whether the attribute parameter set has been formed on the basis of visual properties of a surface of an object in the three-dimensional scene;

use the attribute parameter set to reconstruct the three-dimensional scene, if the examination reveals that the attribute parameter set has been formed on the basis of visual properties of the surface of the object.

A computer readable storage medium according to an eighth aspect comprises code for use by an apparatus, which when executed by a processor, causes the apparatus to perform:

receive an information element carrying an attribute parameter set, which relates to one or more patches comprising information of a three-dimensional scene;

examine an indication to determine whether the attribute parameter set has been formed on the basis of visual properties of a surface of an object in the three-dimensional scene;

use the attribute parameter set to reconstruct the three-dimensional scene, if the examination reveals that the attribute parameter set has been formed on the basis of visual properties of the surface of the object.

An apparatus according to a ninth aspect comprises means for:

receiving an information element carrying an attribute parameter set, which relates to one or more patches comprising information of a three-dimensional scene;

examining an indication to determine whether the attribute parameter set has been formed on the basis of visual properties of a surface of an object in the three-dimensional scene;

using the attribute parameter set to reconstruct the three-dimensional scene, if the examination reveals that the attribute parameter set has been formed on the basis of visual properties of the surface of the object.

An apparatus according to a tenth aspect comprises:

a first circuitry configured to receive an information element carrying an attribute parameter set, which relates to one or more patches comprising information of a three-dimensional scene;

a second circuitry configured to examine an indication to determine whether the attribute parameter set has been formed on the basis of visual properties of a surface of an object in the three-dimensional scene;

a third circuitry configured to use the attribute parameter set to reconstruct the three-dimensional scene, if the examination reveals that the attribute parameter set has been formed on the basis of visual properties of the surface of the object.

Further aspects include at least apparatuses and computer program products/code stored on a non-transitory memory medium arranged to carry out the above methods.

BRIEF DESCRIPTION OF THE DRAWINGS

For a more complete understanding of example embodiments of the present invention, reference is now made to the following descriptions taken in connection with the accompanying drawings in which:

FIG. 13 illustrates an example of a part of a video point cloud compression bitstream, in accordance with an embodiment;

FIGS. 14a-14c illustrate examples of reflection of a bright light source on a surface;

FIGS. 15a and 15b illustrate examples of different reflectance values depending on surface albedo;

FIGS. 16a-16c illustrate examples of different light reflections from a surface;

FIG. 17a illustrates an example of bidirectional scattering distribution function as a combination of a bidirectional reflectance distribution function and a bidirectional transmittance distribution function;

FIG. 17b illustrates an example of a bidirectional scattering-surface reflectance distribution function;

FIG. 17c illustrates an example of a bidirectional scattering-surface reflectance distribution function including subsurface scattering;

DETAILED DESCRIPTION OF SOME EXAMPLE EMBODIMENTS

In the following, several embodiments of the invention will be described in the context of point cloud, voxel or mesh scene models for three-dimensional volumetric video and pixel and picture based two-dimensional video coding. It is to be noted, however, that the invention is not limited to specific scene models or specific coding technologies. In fact, the different embodiments have applications in any environment where coding of volumetric scene data is required.

Point clouds are commonly used data structures for storing volumetric content. Compared to point clouds, sparse voxel octrees describe a recursive subdivision of a finite volume with solid voxels of varying sizes, while point clouds describe an unorganized set of separate points limited only by the precision of the used coordinate values.

A volumetric video frame is a sparse voxel octree or a point cloud that models the world at a specific point in time, similar to a frame in a 2D video sequence. Voxel or point attributes contain information like colour, opacity, surface normal vectors, and surface material properties. These are referenced in the sparse voxel octrees (e.g. colour of a solid voxel) or point clouds, but can also be stored separately.

When encoding a volumetric video, each frame may produce several hundred megabytes or several gigabytes of voxel data which needs to be converted to a format that can be streamed to the viewer and rendered in real-time. The amount of data depends on the world complexity and the number of cameras. The larger impact comes in a multi-device recording setup with a number of separate locations where the cameras are recording. Such a setup produces more information than a camera at a single location.

Figure 1:
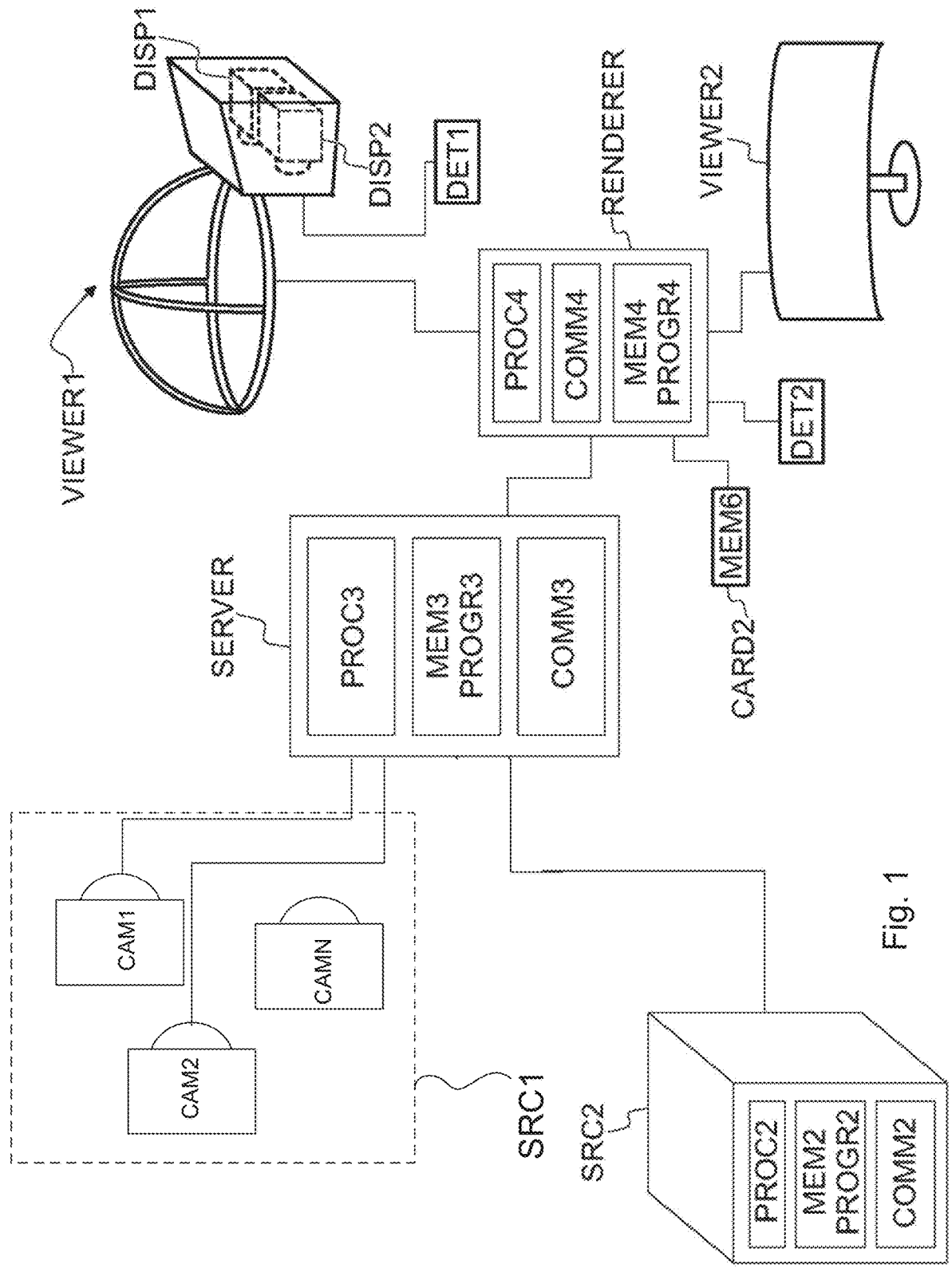
FIG. 1 shows a system for capturing, encoding, decoding, reconstructing and viewing a three-dimensional scheme.

FIG. 1 shows a system for capturing, encoding, decoding, reconstructing and viewing a three-dimensional scheme, that is, for 3D video and 3D audio digital creation and playback. The task of the system is that of capturing sufficient visual and auditory information from a specific scene to be able to create a scene model such that a convincing reproduction of the experience, or presence, of being in that location can be achieved by one or more viewers physically located in different locations and optionally at a time later in the future. Such reproduction requires more information that can be captured by a single camera or microphone, in order that a viewer can determine the distance and location of objects within the scene using their eyes and their ears. To create a pair of images with disparity, two camera sources are used. In a similar manner, for the human auditory system to be able to sense the direction of sound, at least two microphones are used (the commonly known stereo sound is created by recording two audio channels). The human auditory system can detect the cues, e.g. in timing difference of the audio signals to detect the direction of sound.

The system of FIG. 1 may consist of three main parts: image sources, a server and a rendering device. A video source SRC1 may comprise multiple cameras CAM1, CAM2, . . . , CAMN with overlapping field of view so that regions of the view around the video capture device is captured from at least two cameras. The video source SRC1 may comprise multiple microphones to capture the timing and phase differences of audio originating from different directions. The video source SRC1 may comprise a high-resolution orientation sensor so that the orientation (direction of view) of the plurality of cameras CAM1, CAM2, . . . , CAMN can be detected and recorded. The cameras or the computers may also comprise or be functionally connected to means for forming distance information corresponding to the captured images, for example so that the pixels have corresponding depth data. Such depth data may be formed by scanning the depth or it may be computed from the different images captured by the cameras. The video source SRC1 comprises or is functionally connected to, or each of the plurality of cameras CAM1, CAM2, . . . , CAMN comprises or is functionally connected to a computer processor and memory, the memory comprising computer program code for controlling the source and/or the plurality of cameras. The image stream captured by the video source, i.e. the plurality of the cameras, may be stored on a memory device for use in another device, e.g. a viewer, and/or transmitted to a server using a communication interface. It needs to be understood that although a video source comprising three cameras is described here as part of the system, another amount of camera devices may be used instead as part of the system.

Alternatively, or additionally to the source device SRC1 creating information for forming a scene model, one or more sources SRC2 of synthetic imagery may be present in the system, comprising a scene model. Such sources may be used to create and transmit the scene model and its development over time, e.g. instantaneous states of the model. The model can be created or provided by the source SRC1 and/or SRC2, or by the server SERVER. Such sources may also use the model of the scene to compute various video bitstreams for transmission.

One or more two-dimensional video bitstreams may be computed at the server SERVER or a device RENDERER used for rendering, or another device at the receiving end. When such computed video streams are used for viewing, the viewer may see a three-dimensional virtual world as described in the context of FIGS. 4a-4d. The devices SRC1 and SRC2 may comprise or be functionally connected to one or more computer processors (PROC2 shown) and memory (MEM2 shown), the memory comprising computer program (PROGR2 shown) code for controlling the source device SRC1/SRC2. The image stream captured by the device and the scene model may be stored on a memory device for use in another device, e.g. a viewer, or transmitted to a server or the viewer using a communication interface COMM2. There may be a storage, processing and data stream serving network in addition to the capture device SRC1. For example, there may be a server SERVER or a plurality of servers storing the output from the capture device SRC1 or device SRC2 and/or to form a scene model from the data from devices SRC1, SRC2. The device SERVER comprises or is functionally connected to a computer processor PROC3 and memory MEM3, the memory comprising computer program PROGR3 code for controlling the server. The device SERVER may be connected by a wired or wireless network connection, or both, to sources SRC1 and/or SRC2, as well as the viewer devices VIEWER1 and VIEWER2 over the communication interface COMM3.

The creation of a three-dimensional scene model may take place at the server SERVER or another device by using the images captured by the devices SRC1. The scene model may be a model created from captured image data (a real-world model), or a synthetic model such as on device SRC2, or a combination of such. As described later, the scene model may be encoded to reduce its size and transmitted to a decoder, for example viewer devices.

For viewing the captured or created video content, there may be one or more viewer devices VIEWER1 and VIEWER2. These devices may have a rendering module and a display module, or these functionalities may be combined in a single device. The devices may comprise or be functionally connected to a computer processor PROC4 and memory MEM4, the memory comprising computer program PROG4 code for controlling the viewing devices. The viewer (playback) devices may consist of a data stream receiver for receiving a video data stream and for decoding the video data stream. The video data stream may be received from the server SERVER or from some other entity, such as a proxy server, an edge server of a content delivery network, or a file available locally in the viewer device. The data stream may be received over a network connection through communications interface COMM4, or from a memory device MEM6 like a memory card CARD2. The viewer devices may have a graphics processing unit for processing of the data to a suitable format for viewing. The viewer VIEWER1 may comprise a high-resolution stereo-image head-mounted display for viewing the rendered stereo video sequence. The head-mounted display may have an orientation sensor DET1 and stereo audio headphones. The viewer VIEWER2 may comprise a display (either two-dimensional or a display enabled with 3D technology for displaying stereo video), and the rendering device may have an orientation detector DET2 connected to it. Alternatively, the viewer VIEWER2 may comprise a 2D display, since the volumetric video rendering can be done in 2D by rendering the viewpoint from a single eye instead of a stereo eye pair.

It needs to be understood that FIG. 1 depicts one SRC1 device and one SRC2 device, but generally the system may comprise more than one SRC1 device and/or SRC2 device. Any of the devices (SRC1, SRC2, SERVER, RENDERER, VIEWER1, VIEWER2) may be a computer or a portable computing device or be connected to such or configured to be connected to such. Moreover, even if the devices (SRC1, SRC2, SERVER, RENDERER, VIEWER1, VIEWER2) are depicted as a single device in FIG. 1, they may comprise multiple parts or may be comprised of multiple connected devices. For example, it needs to be understood that SERVER may comprise several devices, some of which may be used for editing the content produced by SRC1 and/or SRC2 devices, some others for compressing the edited content, and a third set of devices may be used for transmitting the compressed content. Such devices may have computer program code for carrying out methods according to various examples described in this text.

Figure 2A:
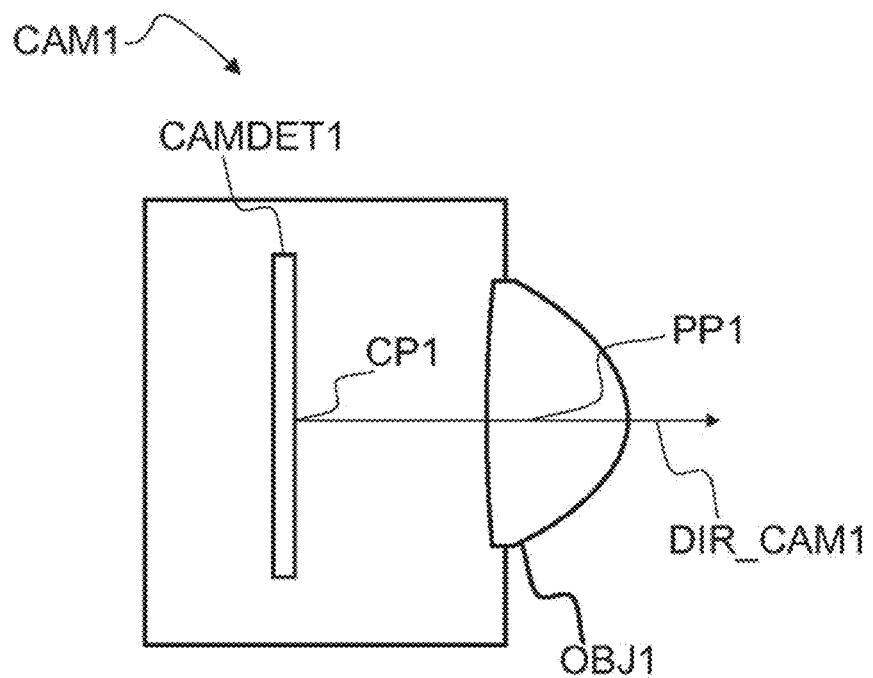
FIGS. 2a and 2b show a capture device and a viewing device.
Figure 2B:
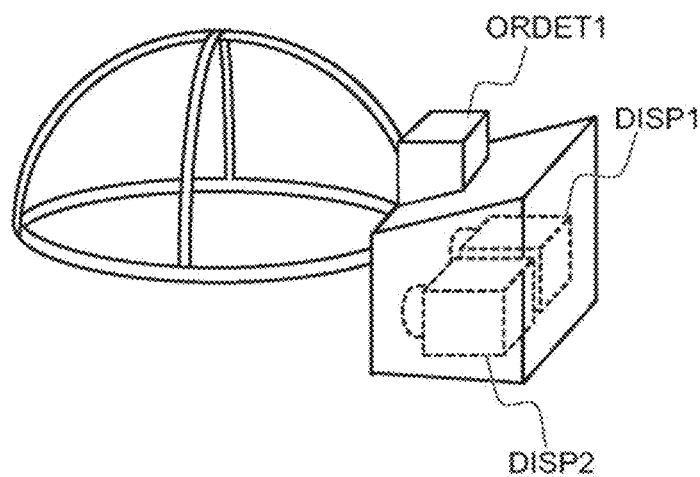

FIGS. 2a and 2b show a capture device and a viewing device, respectively. FIG. 2a illustrates a camera CAM1. The camera has a camera detector CAMDET1, comprising a plurality of sensor elements for sensing intensity of the light hitting the sensor element. The camera has a lens OBJ1 (or a lens arrangement of a plurality of lenses), the lens being positioned so that the light hitting the sensor elements travels through the lens to the sensor elements. The camera detector CAMDET1 has a nominal centre point CP1 that is a middle point of the plurality of sensor elements, for example for a rectangular sensor the crossing point of diagonals of the rectangular sensor. The lens has a nominal centre point PP1, as well, lying for example on the axis of symmetry of the lens. The direction of orientation of the camera is defined by the line passing through the centre point CP1 of the camera sensor and the centre point PP1 of the lens. The direction of the camera is a vector along this line pointing in the direction from the camera sensor to the lens. The optical axis of the camera is understood to be this line CP1-PP1. However, the optical path from the lens to the camera detector need not always be a straight line but there may be mirrors and/or some other elements which may affect the optical path between the lens and the camera detector.

FIG. 2b shows a head-mounted display (HMD) for stereo viewing. The head-mounted display comprises two screen sections or two screens DISP1 and DISP2 for displaying the left and right eye images. The displays are close to the eyes, and therefore lenses are used to make the images easily viewable and for spreading the images to cover as much as possible of the eyes' field of view. When the device will be used by a user, the user may put the device on her/his head so that it will be attached to the head of the user so that it stays in place even when the user turns his head. The device may have an orientation detecting module ORDET1 for determining the head movements and direction of the head. The head-mounted display gives a three-dimensional (3D) perception of the recorded/streamed content to a user.

The system described above may function as follows. Time-synchronized video and orientation data is first recorded with the capture devices. This can consist of multiple concurrent video streams as described above. One or more time-synchronized audio streams may also be recorded with the capture devices. The different capture devices may form image and geometry information of the scene from different directions. For example, there may be three, four, five, six or more cameras capturing the scene from different sides, like front, back, left and right, and/or at directions between these, as well as from the top or bottom, or any combination of these. The cameras may be at different distances, for example some of the cameras may capture the whole scene and some of the cameras may be capturing one or more objects in the scene. In an arrangement used for capturing volumetric video data, several cameras may be directed towards an object, looking onto the object from different directions, where the object is e.g. in the middle of the cameras. In this manner, the texture and geometry of the scene and the objects within the scene may be captured adequately. As mentioned earlier, the cameras or the system may comprise means for determining geometry information, e.g. depth data, related to the captured video streams. From these concurrent video and audio streams, a computer model of a scene may be created. Alternatively, or additionally, a synthetic computer model of a virtual scene may be used. The models (at successive time instances) are then transmitted immediately or later to the storage and processing network for processing and conversion into a format suitable for subsequent delivery to playback devices. The conversion may involve processing and coding to improve the quality and/or reduce the quantity of the scene model data while preserving the quality at a desired level. Each playback device receives a stream of the data (either computed video data or scene model data) from the network and renders it into a viewing reproduction of the original location which can be experienced by a user. The reproduction may be two-dimensional or three-dimensional (stereo image pairs).

Figure 3A:
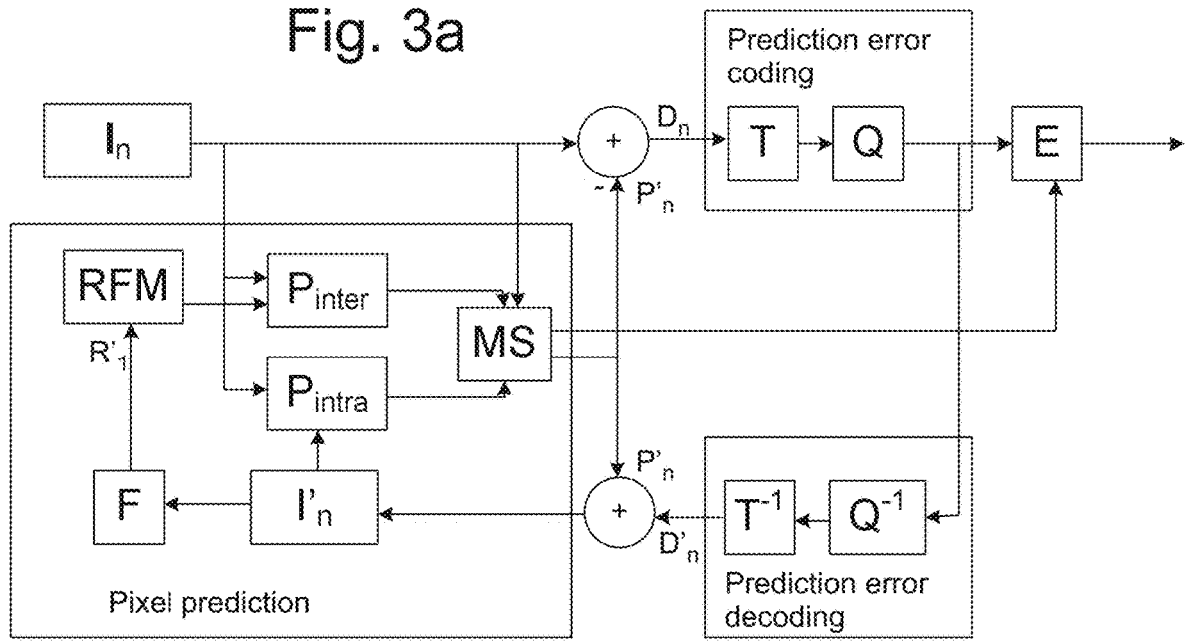
FIGS. 3a and 3b show an encoder and decoder for encoding and decoding texture pictures, geometry pictures and/or auxiliary pictures.
Figure 3B:
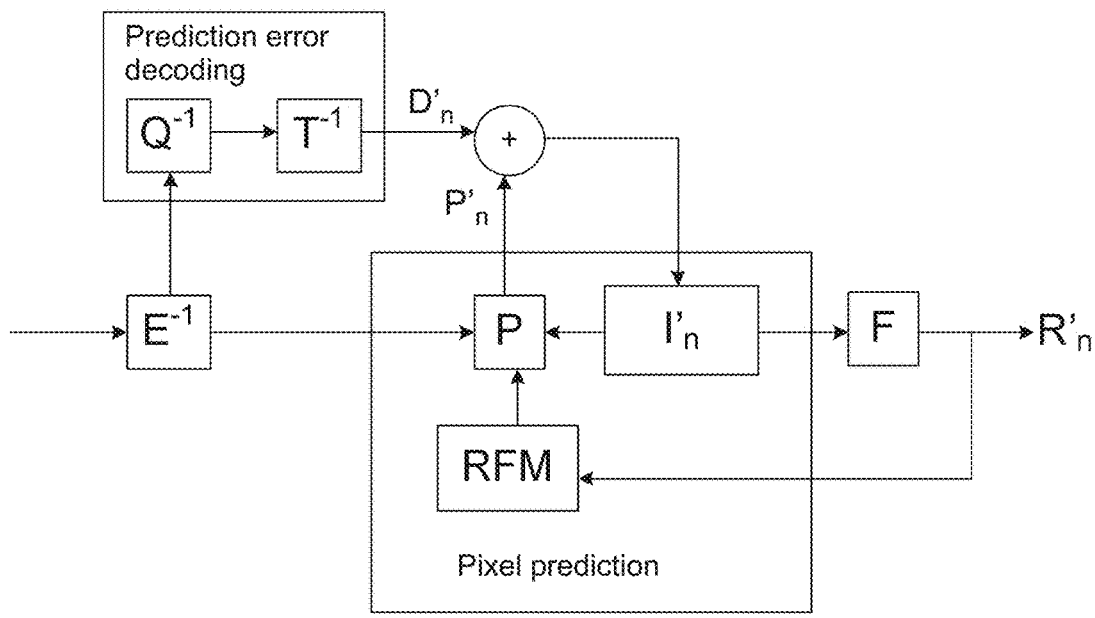

FIGS. 3a and 3b show an encoder and decoder, respectively, for encoding and decoding texture pictures, geometry pictures and/or auxiliary pictures. A video codec consists of an encoder that transforms an input video into a compressed representation suited for storage/transmission and a decoder that can uncompress the compressed video representation back into a viewable form. Typically, the encoder discards and/or loses some information in the original video sequence in order to represent the video in a more compact form (that is, at lower bitrate). An example of an encoding process is illustrated in FIG. 3a. FIG. 3a illustrates an image to be encoded ($I_n$); a predicted representation of an image block ($P'_n$); a prediction error signal ($D_n$); a reconstructed prediction error signal ($D'_n$); a preliminary reconstructed image ($I'_n$); a final reconstructed image ($R'_n$); a transform (T) and inverse transform ($T^{-1}$); a quantization (Q) and inverse quantization ($Q^{-1}$); entropy encoding (E); a reference frame memory (RFM); inter prediction ($P_{inter}$); intra prediction ($P_{intra}$); mode selection (MS) and filtering (F).

An example of a decoding process is illustrated in FIG. 3b. FIG. 3b illustrates a predicted representation of an image block ($P'_n$); a reconstructed prediction error signal ($D'_n$); a preliminary reconstructed image ($I'_n$); a final reconstructed image ($R'_n$); an inverse transform ($T^{-1}$); an inverse quantization ($Q^{-1}$); an entropy decoding ($E^{-1}$); a reference frame memory (RFM); a prediction (either inter or intra) (P); and filtering (F).

Figure 4A:
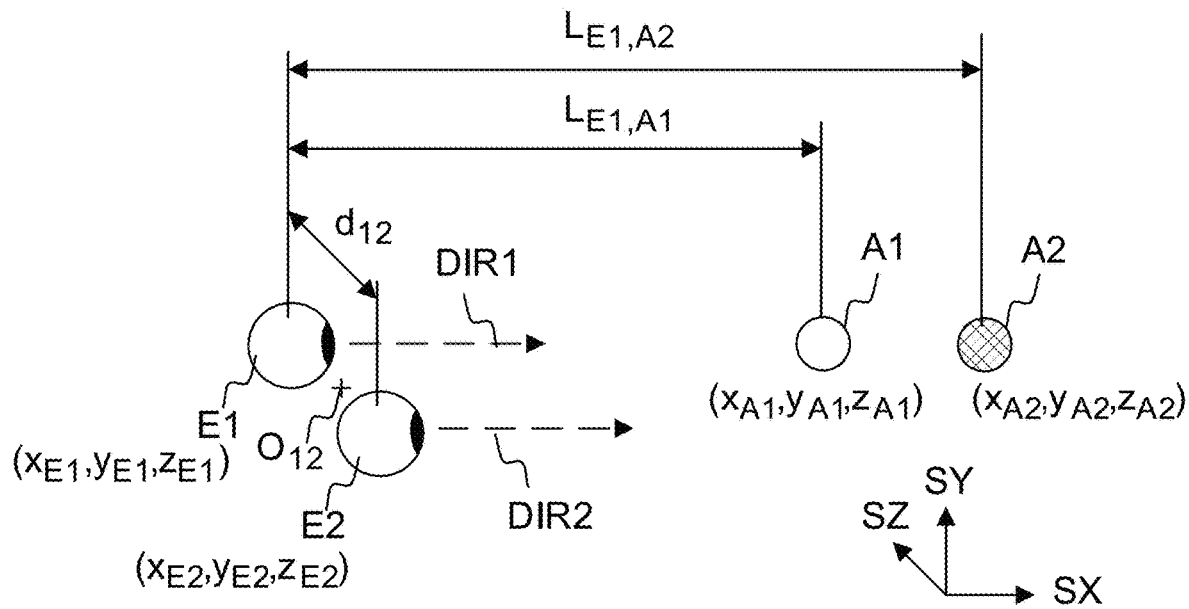
FIGS. 4a, 4b, 4c and 4d show a setup for forming a stereo image of a scene to a user.

FIGS. 4a, 4b, 4c and 4d show a setup for forming a stereo image of a scene to a user, for example a video frame of a 3D video. In FIG. 4a, a situation is shown where a human being is viewing two spheres A1 and A2 using both eyes E1 and E2. The sphere A1 is closer to the viewer than the sphere A2, the respective distances to the first eye E1 being $L_{E1,A1}$ and $L_{E1,A2}$. The different objects reside in space at their respective (x,y,z) coordinates, defined by the coordinate system SZ, SY and SZ. The distance $d_{12}$ between the eyes of a human being may be approximately 62-64 mm on average, and varying from person to person between 55 and 74 mm.

This distance is referred to as the parallax, on which stereoscopic view of the human vision is based on. The viewing directions (optical axes) DIR1 and DIR2 are typically essentially parallel, possibly having a small deviation from being parallel, and define the field of view for the eyes. The head of the user has an orientation (head orientation) in relation to the surroundings, most easily defined by the common direction of the eyes when the eyes are looking straight ahead. That is, the head orientation tells the yaw, pitch and roll of the head in respect of a coordinate system of the scene where the user is.

When the viewer's body (thorax) is not moving, the viewer's head orientation is restricted by the normal anatomical ranges of movement of the cervical spine.

In the setup of FIG. 4a, the spheres A1 and A2 are in the field of view of both eyes. The centre-point $O_{12}$ between the eyes and the spheres are on the same line. That is, from the centre-point, the sphere A2 is behind the sphere A1. However, each eye sees part of sphere A2 from behind A1, because the spheres are not on the same line of view from either of the eyes.

Figure 4B:
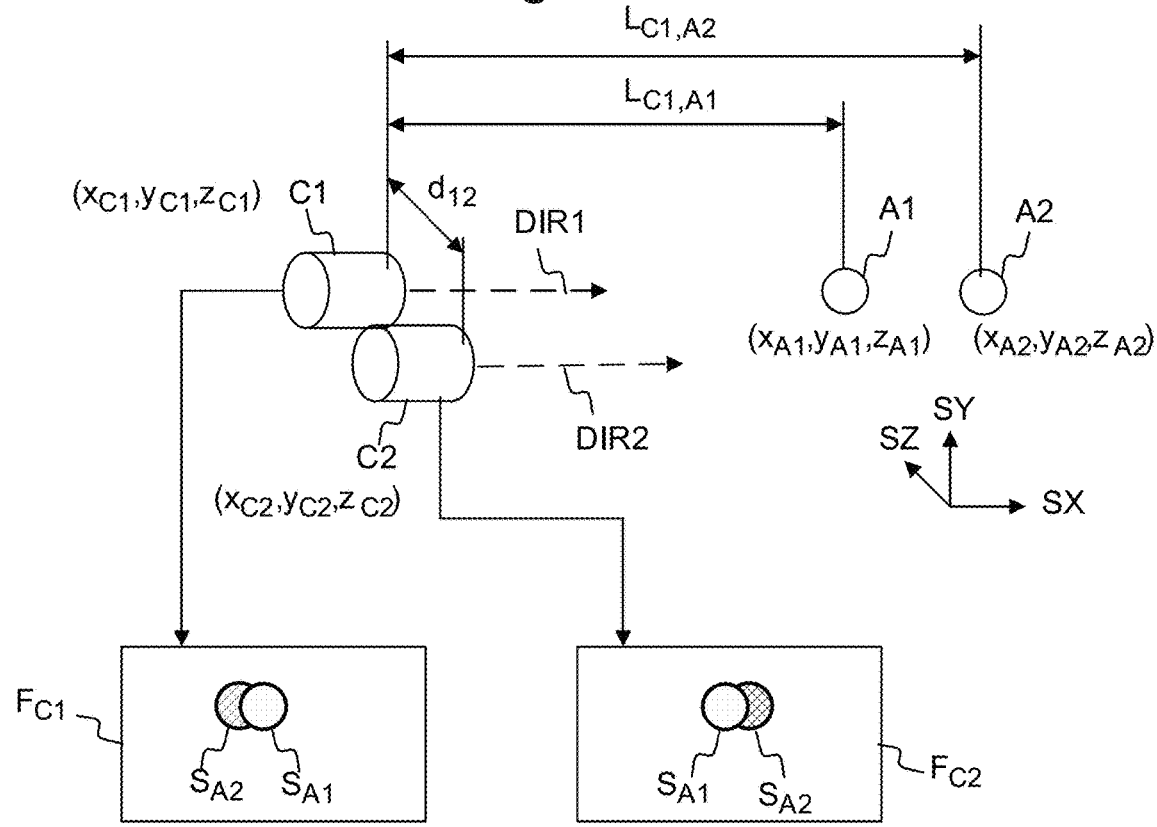

In FIG. 4b, there is a setup shown, where the eyes have been replaced by cameras C1 and C2, positioned at the location where the eyes were in FIG. 4a. The distances and directions of the setup are otherwise the same. Naturally, the purpose of the setup of FIG. 4b is to be able to take a stereo image of the spheres A1 and A2. The two images resulting from image capture are $F_{C1}$ and $F_{C2}$. The "left eye" image $F_{C1}$ shows the image $S_{A2}$ of the sphere A2 partly visible on the left side of the image $S_{A1}$ of the sphere A1. The "right eye" image $F_{C2}$ shows the image $S_{A2}$ of the sphere A2 partly visible on the right side of the image $S_{A1}$ of the sphere A1. This difference between the right and left images is called disparity, and this disparity, being the basic mechanism with which the HVS determines depth information and creates a 3D view of the scene, can be used to create an illusion of a 3D image.

In this setup of FIG. 4b, where the inter-eye distances correspond to those of the eyes in FIG. 4a, the camera pair C1 and C2 has a natural parallax, that is, it has the property of creating natural disparity in the two images of the cameras. Natural disparity may be understood to be created even though the distance between the two cameras forming the stereo camera pair is somewhat smaller or larger than the normal distance (parallax) between the human eyes, e.g. essentially between 40 mm and 100 mm or even 30 mm and 120 mm.

It needs to be understood here that the images $F_{C1}$ and $F_{C2}$ may be captured by cameras C1 and C2, where the cameras C1 and C2 may be real-world cameras or they may be virtual cameras. In the case of virtual cameras, the images $F_{C1}$ and $F_{C2}$ may be computed from a computer model of a scene by setting the direction, orientation and viewport of the cameras C1 and C2 appropriately such that a stereo image pair suitable for viewing by the human visual system (HVS) is created.

Figure 4C:
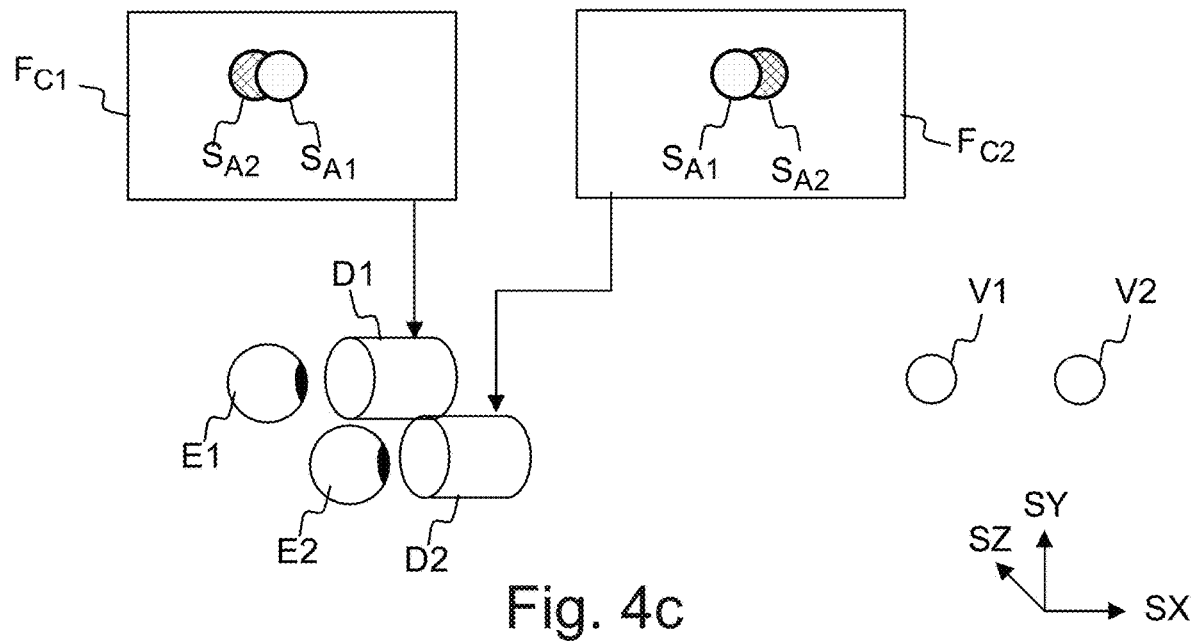

In FIG. 4c, the creating of this 3D illusion is shown. The images $F_{C1}$ and $F_{C2}$ captured or computed by the cameras C1 and C2 are displayed to the eyes E1 and E2, using displays D1 and D2, respectively. The disparity between the images is processed by the human visual system so that an understanding of depth is created. That is, when the left eye sees the image $S_{A2}$ of the sphere A2 on the left side of the image $S_{A1}$ of sphere A1, and respectively the right eye sees the image $S_{A2}$ of the sphere A2 on the right side, the human visual system creates an understanding that there is a sphere V2 behind the sphere V1 in a three-dimensional world. Here, it needs to be understood that the images $F_{C1}$ and $F_{C2}$ can also be synthetic, that is, created by a computer. If they carry the disparity information, synthetic images will also be seen as three-dimensional by the human visual system. That is, a pair of computer-generated images can be formed so that they can be used as a stereo image.

Figure 4D:
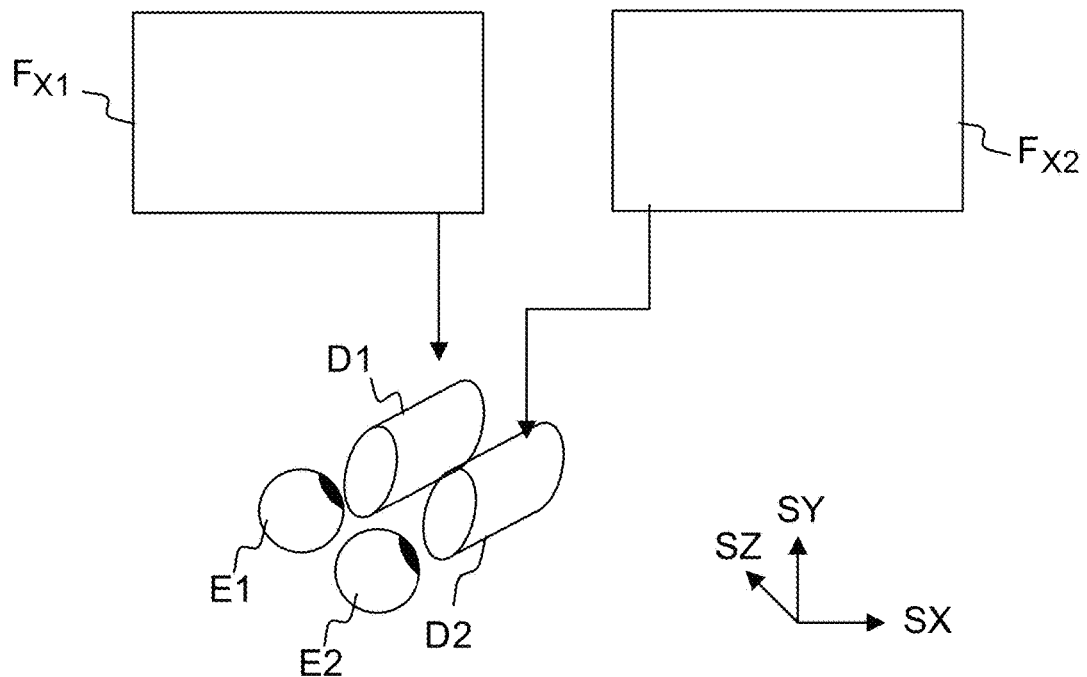

FIG. 4d illustrates how the principle of displaying stereo images to the eyes can be used to create 3D movies or virtual reality scenes having an illusion of being three-dimensional. The images $F_{X1}$ and $F_{X2}$ are either captured with a stereo camera or computed from a model so that the images have the appropriate disparity. By displaying a large number (e.g. 30) frames per second to both eyes using display D1 and D2 so that the images between the left and the right eye have disparity, the human visual system will create a cognition of a moving, three-dimensional image.

The field of view represented by the content may be greater than the displayed field of view e.g. in an arrangement depicted in FIG. 4d. Consequently, only a part of the content along the direction of view (a.k.a. viewing orientation) is displayed at a single time. This direction of view, that is, the head orientation, may be determined as a real orientation of the head e.g. by an orientation detector mounted on the head, or as a virtual orientation determined by a control device such as a joystick or mouse that can be used to manipulate the direction of view without the user actually moving his head. That is, the term "head orientation" may be used to refer to the actual, physical orientation of the user's head and changes in the same, or it may be used to refer to the virtual direction of the user's view that is determined by a computer program or a computer input device.

The content may enable viewing from several viewing positions within the 3D space. The texture picture(s), the geometry picture(s) and the geometry information may be used to synthesize the images $F_{X1}$ and/or $F_{X2}$ as if the displayed content was captured by camera(s) located at the viewing position.

The principle illustrated in FIGS. 4a-4d may be used to create three-dimensional images to a viewer from a three-dimensional scene model (volumetric video) after the scene model has been encoded at the sender and decoded and reconstructed at the receiver. Because volumetric video describes a 3D scene or object at different (successive) time instances, such data can be viewed from any viewpoint. Therefore, volumetric video is an important format for any augmented reality, virtual reality and mixed reality applications, especially for providing viewing capabilities having six degrees of freedom (so-called 6DOF viewing).

Figure 5A:
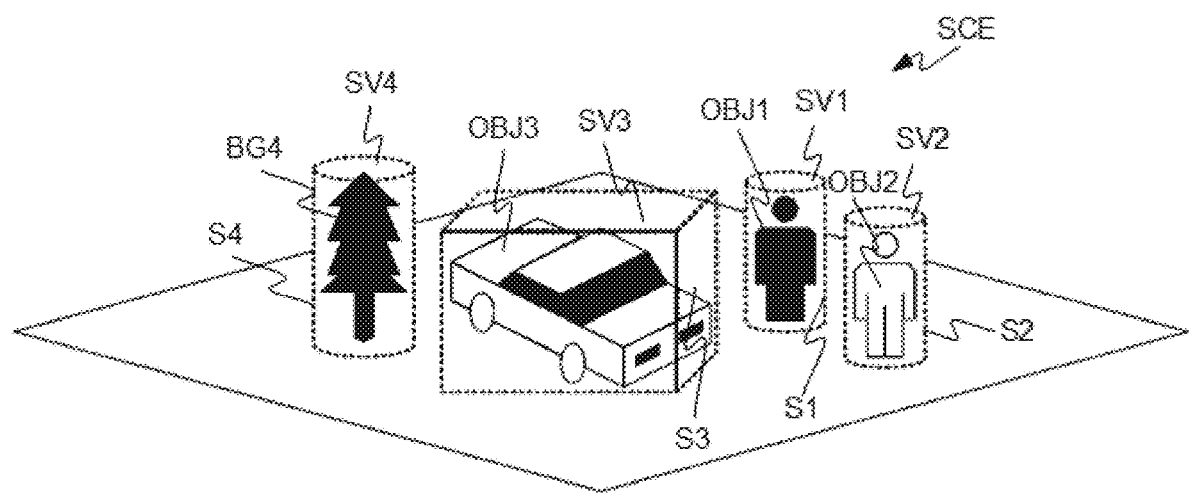
FIGS. 5a and 5b illustrate projection of source volumes in a scene and parts of an object to projection surfaces.
Figure 5B:
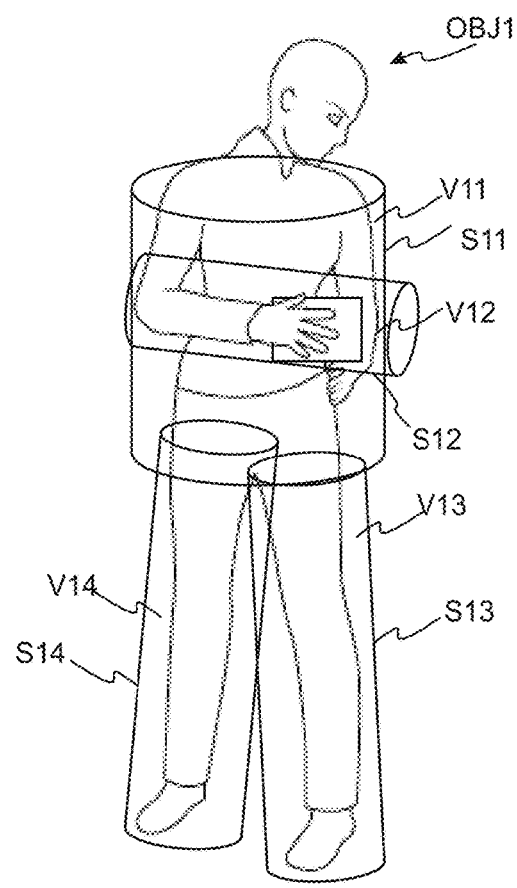

FIGS. 5a and 5b illustrate projection of source volumes in a digital scene model SCE and parts of an object model OBJ1, OBJ2, OBJ3, BG4 to projection surfaces S1, S2, S3, S4, as well as determining depth information for the purpose of encoding volumetric video.

As illustrated in FIG. 5a, a first texture picture may be encoded into a bitstream, and the first texture picture may comprise a first projection of texture data of a first source volume SV1 of a scene model SCE onto a first projection surface S1. The scene model SCE may comprise further source volumes SV2, SV3, SV4.

The projection of source volumes SV1, SV2, SV3, SV4 may result in texture pictures and geometry pictures, and there may be geometry information related to the projection source volumes and/or projection surfaces. Texture pictures, geometry pictures and projection geometry information may be encoded into a bitstream. A texture picture may comprise information on the colour data of the source of the projection. Through the projection, such colour data may result in pixel colour information in the texture picture. Pixels may be coded in groups, e.g. coding units of rectangular shape. The projection geometry information may comprise but is not limited to one or more of the following:

projection type, such as planar projection or equirectangular projection
projection surface type, such as a cube
location of the projection surface in 3D space
orientation of the projection surface in 3D space
size of the projection surface in 3D space
type of a projection centre, such as a projection centre point, axis, or plane
location and/or orientation of a projection centre.

The projection may take place by projecting the geometry primitives (points of a point could, triangles of a triangle mesh or voxels of a voxel array) of a source volume SV1, SV2, SV3, SV4 (or an object OBJ1, OBJ2, OBJ3, BG4) onto a projection surface S1, S2, S3, S4. The geometry primitives may comprise information on the texture, for example a colour value or values of a point, a triangle or a voxel. The projection surface may surround the source volume at least partially such that projection of the geometry primitives happens from the centre of the projection surface outwards to the surface. For example, a cylindrical surface has a centre axis and a spherical surface has a centre point. A cubical or rectangular surface may have centre planes or a centre axis and the projection of the geometry primitives may take place either orthogonally to the sides of the surface or from the centre axis outwards to the surface. The projection surfaces, e.g. cylindrical and rectangular, may be open from the top and the bottom such that when the surface is cut and rolled out on a two-dimensional plane, it forms a rectangular shape. In general, projection surfaces need not be rectangular but may be arranged or located spatially on a rectangular picture. Such rectangular shape with pixel data can be encoded and decoded with a video codec.

Alternatively, or additionally, the projection surface such as a planar surface or a sphere may be inside a group of geometry primitives, e.g. inside a point cloud that defines a surface. In the case of an inside projection surface, the projection may take place from outside in towards the centre and may result in sub-sampling of the texture data of the source.

In a point cloud-based scene or object model, points may be represented with any floating point coordinates. A quantized point cloud may be used to reduce the amount of data, whereby the coordinate values of the point cloud are represented e.g. with 10-bit, 12-bit or 16-bit integers. Integers may be used because hardware accelerators may be able to operate on integers more efficiently. The points in the point cloud may have associated colour, reflectance, opacity etc. texture values. The points in the point cloud may also have a size, or a size may be the same for all points. The size of the points may be understood as indicating how large an object the point appears to be in the model in the projection. The point cloud is projected by ray casting from the projection surface to find out the pixel values of the projection surface. In such a manner, the topmost point remains visible in the projection, while points closer to the centre of the projection surface may be occluded. In other words, in general, the original point cloud, meshes, voxels, or any other model is projected outwards to a simple geometrical shape, this simple geometrical shape being the projection surface.

Different projection surfaces may have different characteristics in terms of projection and reconstruction. In the sense of computational complexity, a projection to a cubical surface may be the most efficient, and a cylindrical projection surface may provide accurate results efficiently. Also cones, polyhedron-based parallelepipeds (hexagonal or octagonal, for example) and spheres or a simple plane may be used as projection surfaces.

In the projection, data on the position of the originating geometry primitive may also be determined, and based on this determination, a geometry picture may be formed. This may happen for example so that depth data is determined for each or some of the texture pixels of the texture picture. Depth data is formed such that the distance from the originating geometry primitive such as a point to the projection surface is determined for the pixels. Such depth data may be represented as a depth picture, and similarly to the texture picture, such geometry picture (in this example, depth picture) may be encoded and decoded with a video codec. This first geometry picture may be seen to represent a mapping of the first projection surface to the first source volume, and the decoder may use this information to determine the location of geometry primitives in the model to be reconstructed. In order to determine the position of the first source volume and/or the first projection surface and/or the first projection in the scene model, there may be first geometry information encoded into or along the bitstream.

A picture may be defined to be either a frame or a field. A frame may be defined to comprise a matrix of luma samples and possibly the corresponding chroma samples. A field may be defined to be a set of alternate sample rows of a frame. Fields may be used as encoder input for example when the source signal is interlaced. Chroma sample arrays may be absent (and hence monochrome sampling may be in use) or may be subsampled when compared to luma sample arrays. Some chroma formats may be summarized as follows:

In monochrome sampling there is only one sample array, which may be nominally considered the luma array.
In 4:2:0 sampling, each of the two chroma arrays has half the height and half the width of the luma array.
In 4:2:2 sampling, each of the two chroma arrays has the same height and half the width of the luma array.
In 4:4:4 sampling when no separate colour planes are in use, each of the two chroma arrays has the same height and width as the luma array.

It is possible to code sample arrays as separate colour planes into the bitstream and respectively decode separately coded colour planes from the bitstream. When separate colour planes are in use, each one of them is separately processed (by the encoder and/or the decoder) as a picture with monochrome sampling.

Texture picture(s) and the respective geometry picture(s) may have the same or different chroma format.

Depending on the context, a pixel may be defined to be a sample of one of the sample arrays of the picture or may be defined to comprise the collocated samples of all the sample arrays of the picture.

Multiple source volumes (objects) may be encoded as texture pictures, geometry pictures and projection geometry information into the bitstream in a similar manner. That is, as in FIG. 5a, the scene model SCE may comprise multiple objects OBJ1, OBJ2, OBJ3, OBJ4, and these may be treated as source volumes SV1, SV2, SV3, SV4 and each object may be coded as a texture picture, geometry picture and projection geometry information.

As shown in FIG. 5b, a single object may be composed of different parts and thus different source volumes V11, V12, V13, V14 and corresponding projection surfaces S11, S12, S13, S14 may be used for these different parts.

In the above, the first texture picture of the first source volume SV1 and further texture pictures of the other source volumes SV2, SV3, SV4 may represent the same time instance. That is, there may be a plurality of texture and geometry pictures and projection geometry information for one time instance, and the other time instances may be coded in a similar manner. Since the various source volumes are in this way producing sequences of texture pictures and sequences of geometry pictures, as well as sequences of projection geometry information, the inter-picture redundancy in the picture sequences can be used to encode the texture and geometry data for the source volumes more efficiently, compared to the presently known ways of encoding volume data.

An object OBJ3 (source volume SV3) may be projected onto a projection surface S3 and encoded into the bitstream as a texture picture, geometry picture and projection geometry information as described above. Furthermore, such source volume may be indicated to be static by encoding information into said bitstream on said fourth projection geometry being static. A static source volume or object may be understood to be an object whose position with respect to the scene model remains the same over two or more or all time instances of the video sequence. For such static source volume, the geometry data (geometry pictures) may also stay the same, that is, the object's shape remains the same over two or more time instances. For such static source volume, some or all of the texture data (texture pictures) may stay the same over two or more time instances. By encoding information into the bitstream of the static nature of the source volume the encoding efficiency may further be improved, as the same information may not need to be coded multiple times. In this manner, the decoder will also be able to use the same reconstruction or partially same reconstruction of the source volume (object) over multiple time instances.

In an analogous manner, the different source volumes may be coded into the bitstream with different frame rates. For example, a slow-moving or relatively unchanging object (source volume) may be encoded with a first frame rate, and a fast-moving and/or changing object (source volume) may be coded with a second frame rate. The first frame rate may be slower than the second frame rate, for example one half or one quarter of the second frame rate, or even slower. For example, if the second frame rate is 30 frames per second, the second frame rate may be 15 frames per second, or 1 frame per second. The first and second object (source volumes) may be "sampled" in synchrony such that some frames of the faster frame rate coincide with frames of the slower frame rate.

There may be one or more coordinate systems in the scene model. The scene model may have a coordinate system and one or more of the objects (source volumes) in the scene model may have their local coordinate systems. The shape, size, location and orientation of one or more projection surfaces may be encoded into or along the bitstream with respect to the scene model coordinates. Alternatively, or in addition, the encoding may be done with respect to coordinates of the scene model or said first source volume. The choice of coordinate systems may improve the coding efficiency.

Information on temporal changes in location, orientation and size of one or more said projection surfaces may be encoded into or along the bitstream. For example, if one or more of the objects (source volumes) being encoded is moving or rotating with respect to the scene model, the projection surface moves or rotates with the object to preserve the projection as similar as possible.

If the projection volumes are changing, for example splitting or bending into two parts, the projection surfaces may be sub-divided respectively. Therefore, information on sub-division of one or more of the source volumes and respective changes in one or more of the projection surfaces may be encoded into or along the bitstream.

The resulting bitstream may then be output to be stored or transmitted for later decoding and reconstruction of the scene model.

Decoding of the information from the bitstream may happen in analogous manner. A first texture picture may be decoded from a bitstream to obtain first decoded texture data, where the first texture picture comprises a first projection of texture data of a first source volume of the scene model to be reconstructed onto a first projection surface. The scene model may comprise a number of further source volumes. Then, a first geometry picture may be decoded from the bitstream to obtain first decoded scene model geometry data. The first geometry picture may represent a mapping of the first projection surface to the first source volume. First projection geometry information of the first projection may be decoded from the bitstream, the first projection geometry information comprising information of position of the first projection surface in the scene model. Using this information, a reconstructed scene model may be formed by projecting the first decoded texture data to a first destination volume using the first decoded scene model geometry data and said first projection geometry information to determine where the decoded texture information is to be placed in the scene model.

A 3D scene model may be classified into two parts: first all dynamic parts, and second all static parts. The dynamic part of the 3D scene model may further be sub-divided into separate parts, each representing objects (or parts of) an object in the scene model, that is, source volumes. The static parts of the scene model may include e.g. static room geometry (walls, ceiling, fixed furniture) and may be compressed either by known volumetric data compression solutions, or, similar to the dynamic part, sub-divided into individual objects for projection-based compression as described earlier, to be encoded into the bitstream.

In an example, some objects may be a chair (static), a television screen (static geometry, dynamic texture), a moving person (dynamic). For each object, a suitable projection geometry (surface) may be found, e.g. cube projection to represent the chair, another cube for the screen, a cylinder for the person's torso, a sphere for a detailed representation of the person's head, and so on. The 3D data of each object may then be projected onto the respective projection surface and 2D planes are derived by "unfolding" the projections from three dimensions to two dimensions (plane). The unfolded planes will have several channels, typically three for the colour representation of the texture, e.g. RGB, YUV, and one additional plane for the geometry (depth) of each projected point for later reconstruction.

Frame packing may be defined to comprise arranging more than one input picture, which may be referred to as (input) constituent frames, into an output picture. In general, frame packing is not limited to any particular type of constituent frames or the constituent frames need not have a particular relation with each other. In many cases, frame packing is used for arranging constituent frames of a stereoscopic video clip into a single picture sequence. The arranging may include placing the input pictures in spatially non-overlapping areas within the output picture. For example, in a side-by-side arrangement, two input pictures are placed within an output picture horizontally adjacently to each other. The arranging may also include partitioning of one or more input pictures into two or more constituent frame partitions and placing the constituent frame partitions in spatially non-overlapping areas within the output picture. The output picture or a sequence of frame-packed output pictures may be encoded into a bitstream e.g. by a video encoder. The bitstream may be decoded e.g. by a video decoder. The decoder or a post-processing operation after decoding may extract the decoded constituent frames from the decoded picture(s) e.g. for displaying.

A standard 2D video encoder may then receive the planes as inputs, either as individual layers per object, or as a frame-packed representation of all objects. The texture picture may thus comprise a plurality of projections of texture data from further source volumes and the geometry picture may represent a plurality of mappings of projection surfaces to the source volume.

For each object, additional information may be signaled to allow for reconstruction at the decoder side:

in the case of a frame-packed representation: separation boundaries may be signaled to recreate the individual planes for each object, in the case of projection-based compression of static content: classification of each object as static/dynamic may be signaled, relevant data to create real-world geometry data from the decoded (quantised) geometry channel(s), e.g. quantisation method, depth ranges, bit depth, etc. may be signaled, initial state of each object: geometry shape, location, orientation, size may be signaled, temporal changes for each object, either as changes to the initial state on a per-picture level, or as a function of time may be signaled, and nature of any additional auxiliary data may be signaled.

For the described example above, signaling may, for example, be as follows:

| | |
|---|---|
| NUM_OBJECTS4 | // folding-chair, TV, person body, person head |
| FRAME_PACKED 0 | // individual inputs |
| for i=0:NUM_OBJECTS | // initial states for each projection |
| PROJ_GEO | // geometry, e.g. 0: cube, 1: cylinder, 2: sphere, ... |
| PROJ_CENTRE_X/Y/Z | // projection centre in real world coordinates |
| PROJ_SIZE_X/Y/Z | // projection dimensions in real world units |
| PROJ_ROTATION_X/Y/Z | // projection orientation |
| PROJ_STATUS | // 0: dynamic 1:static |
| DEPTH_QUANT | // depth quantisation, i.e. 0 for linear, ... |
| DEPTH_MIN | // minimum depth in real world units |
| DEPTH_MAX | // maximum depth in real world units |
| end | |
| for n=0:NUM_FRAMES | |
| for i=0:NUM_OBJECTS | |
| CHANGE 1 | // i.e. 0=static, 1=translation, 2=trans+rotation, ... |
| TRANS_VEC// translation vector | |
| ... | // relevant data to represent change |
| end | |
| end | |

The decoder may receive the static 3D scene model data together with the video bitstreams representing the dynamic parts of the scene model. Based on the signaled information on the projection geometries, each object may be reconstructed in 3D space and the decoded scene model is created by fusing all reconstructed parts (objects or source volumes) together.

Standard video encoding hardware may be utilized for real-time compression/decompression of the projection surfaces that have been unfolded onto planes.

Single projection surfaces might suffice for the projection of very simple objects. Complex objects or larger scenes may require several (different) projections. The relative geometry of the object/scene may remain constant over a volumetric video sequence, but the location and orientation of the projection surfaces in space can change (and can be possibly predicted in the encoding, wherein the difference from the prediction is encoded).

Figure 6:
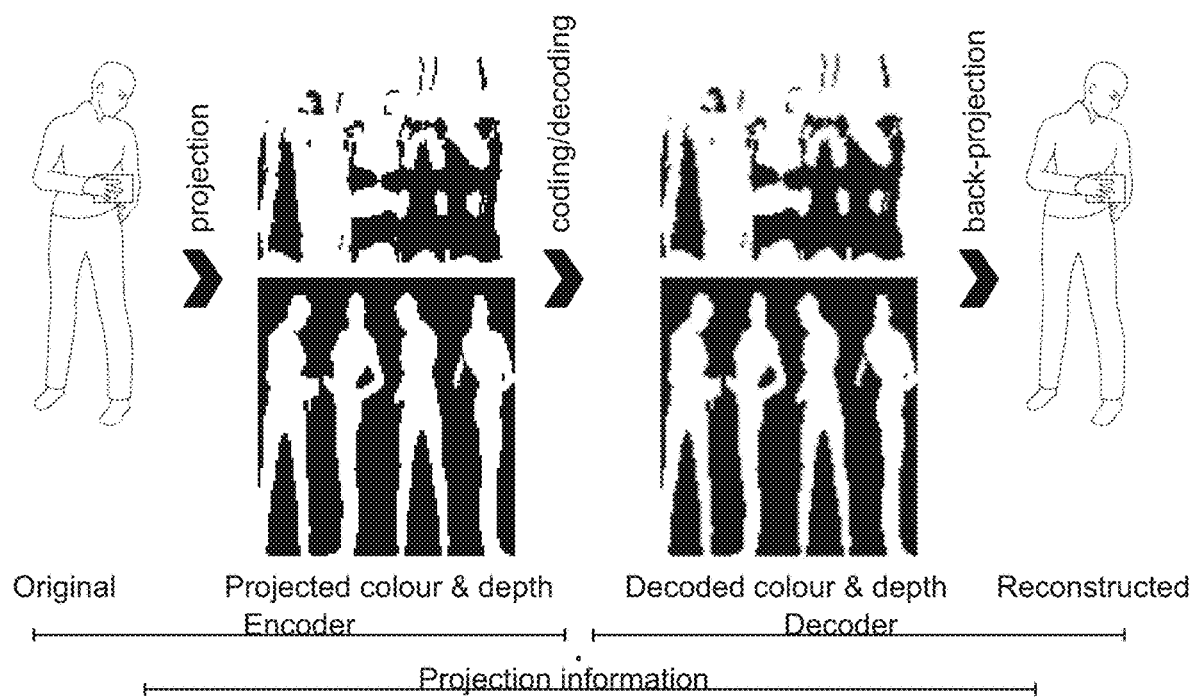
FIG. 6 shows a projection of a source volume to a projection surface and reconstruction after coding/decoding.

FIG. 6 shows a projection of a source volume to a cylindrical projection surface, and inpainting of the sparse projection areas. A three-dimensional (3D) scene model, represented as objects OBJ1 comprising geometry primitives such as mesh elements, points, and/or voxel, may be projected onto one, or more, projection surfaces, as described earlier. As shown in FIG. 6, these projection surface geometries may be "unfolded" onto 2D planes (two planes per projected source volume: one for texture TP1, one for depth GP1), which may then be encoded using standard 2D video compression technologies. Relevant projection geometry information may be transmitted alongside the encoded video files to the decoder. The decoder may then decode the video and performs the inverse projection to regenerate the 3D scene model object ROBJ1 in any desired representation format, which may be different from the starting format e.g. reconstructing a point cloud from original mesh model data.

In addition to the texture picture and geometry picture shown in FIG. 6, one or more auxiliary pictures related to one or more said texture pictures and the pixels thereof may be encoded into or along with the bitstream. The auxiliary pictures may e.g. represent texture surface properties related to one or more of the source volumes. Such texture surface properties may be e.g. surface normal information (e.g. with respect to the projection direction), reflectance and opacity (e.g. an alpha channel value). An encoder may encode, in or along with the bitstream, indication(s) of the type(s) of texture surface properties represented by the auxiliary pictures, and a decoder may decode, from or along the bitstream, indication(s) of the type(s) of texture surface properties represented by the auxiliary pictures.

Mechanisms to represent an auxiliary picture may include but are not limited to the following:

A colour component sample array, such as a chroma sample array, of the geometry picture.

An additional sample array in addition to the conventional three colour component sample arrays of the texture picture or the geometry picture.

A constituent frame of a frame-packed picture that may also comprise texture picture(s) and/or geometry picture(s).

An auxiliary picture included in specific data units in the bitstream. For example, the Advanced Video Coding (H.264/AVC) standard specifies a network abstraction layer (NAL) unit for a coded slice of an auxiliary coded picture without partitioning.

An auxiliary picture layer within a layered bitstream. For example, the High Efficiency Video Coding (HEVC) standard comprises the feature of including auxiliary picture layers in the bitstream. An auxiliary picture layer comprises auxiliary pictures.

An auxiliary picture bitstream separate from the bitstream(s) for the texture picture(s) and geometry picture(s). The auxiliary picture bitstream may be indicated, for example in a container file, to be associated with the bitstream(s) for the texture pictures(s) and geometry picture(s).

The mechanism(s) to be used for auxiliary pictures may be pre-defined e.g. in a coding standard, or the mechanism(s) may be selected e.g. by an encoder and indicated in or along the bitstream. The decoder may decode the mechanism(s) used for auxiliary pictures from or along the bitstream.

The projection surface of a source volume may encompass the source volume, and there may be a model of an object in that source volume. Encompassing may be understood so that the object (model) is inside the surface such that when looking from the centre axis or centre point of the surface, the object's points are closer to the centre than the points of the projection surface are. The model may be made of geometry primitives, as described. The geometry primitives of the model may be projected onto the projection surface to obtain projected pixels of the texture picture. This projection may happen from inside-out. Alternatively, or in addition, the projection may happen from outside-in.

Projecting 3D data onto 2D planes is independent from the 3D scene model representation format. There exist several approaches for projecting 3D data onto 2D planes, with the respective signaling. For example, there exist several mappings from spherical coordinates to planar coordinates, known from map projections of the globe, and the type and parameters of such projection may be signaled. For cylindrical projections, the aspect ratio of height and width may be signaled.

Encoding the projection information may be performed, for example, as follows.

In accordance with an approach, the projected texture planes of a point cloud for one time instant can all be collected and frame-packed and similarly the depth and the possible auxiliary planes are frame-packed such that the frame packing is consistent across all the planes for one time instant. Each of the planes are then coded using traditional 2D video coders using layered video coding or coded independently and related to each other using some form of higher level signaling (for e.g. using tracks and track references of ISO Base Media File Format). Alternatively, each texture, depth and auxiliary planes of a single time instant of a point cloud could be considered independent of each other in that time instant and coded serially one after the other. For example, if there are nine projection surfaces identified of a point cloud, then for that time instant, first the nine texture planes are coded, followed by nine depth planes and followed by nine planes that carry surface normal and so on until all the auxiliary data planes are coded.

Figure 9A:
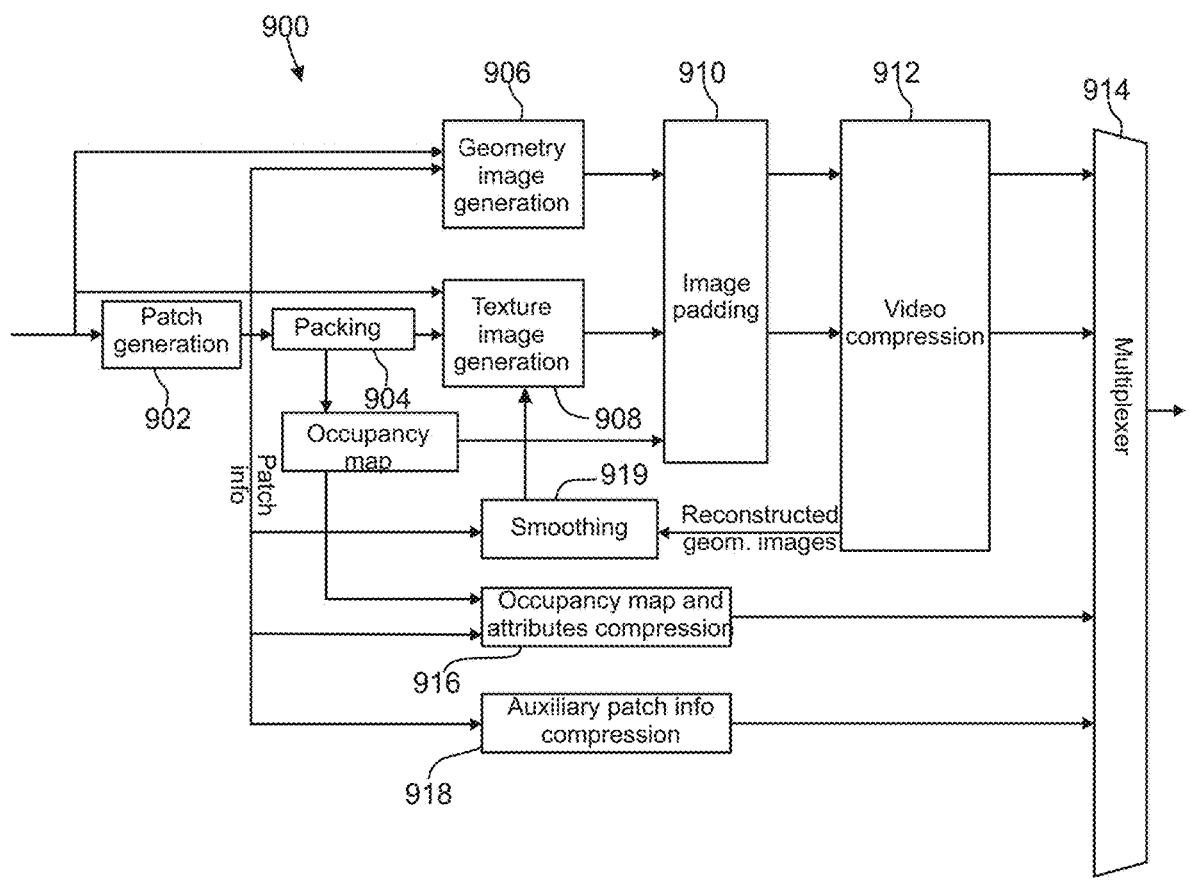
FIG. 9a illustrates an example of an encoder.
Figure 9B:
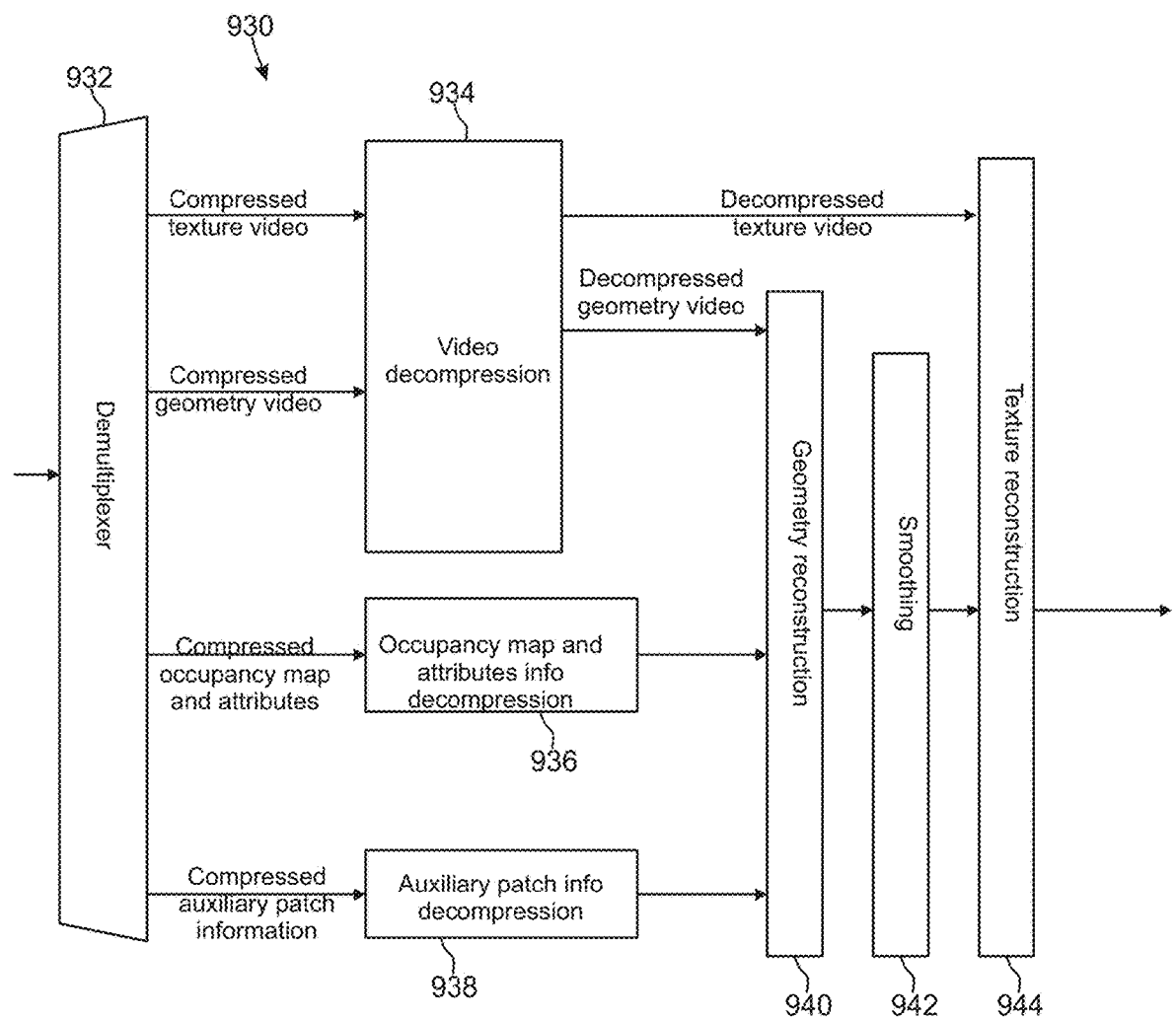
FIG. 9b illustrates an example of a decoder.
Figure 10A:
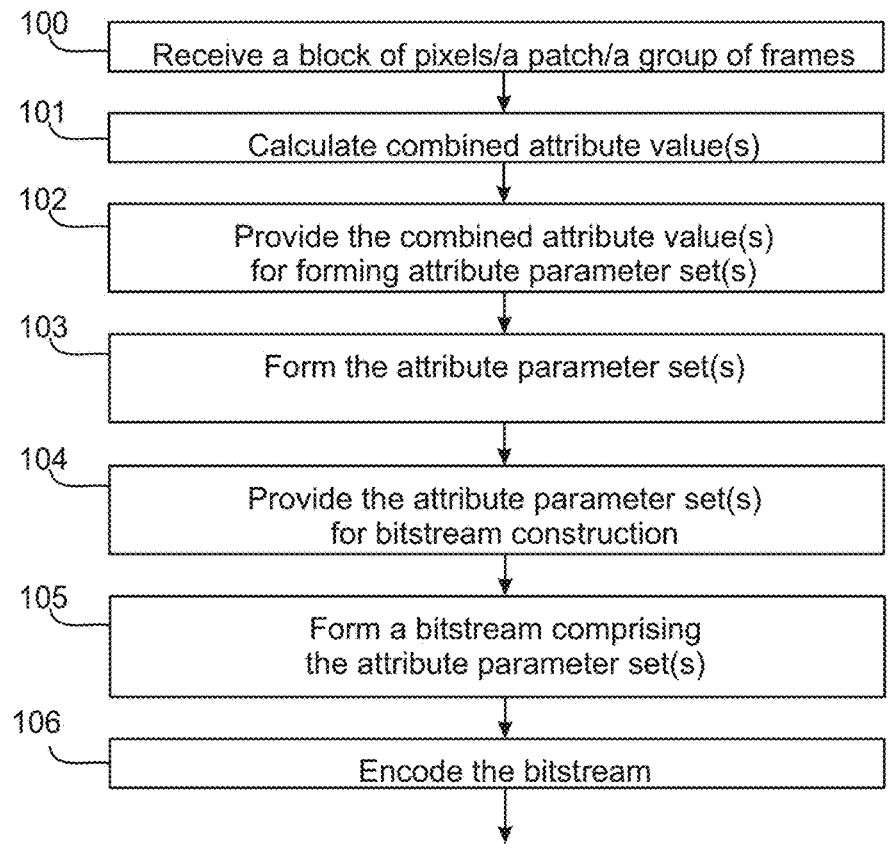
FIG. 10a shows a simplified flow diagram of a processing chain to perform dilation by projection, in accordance with an embodiment.
Figure 10B:
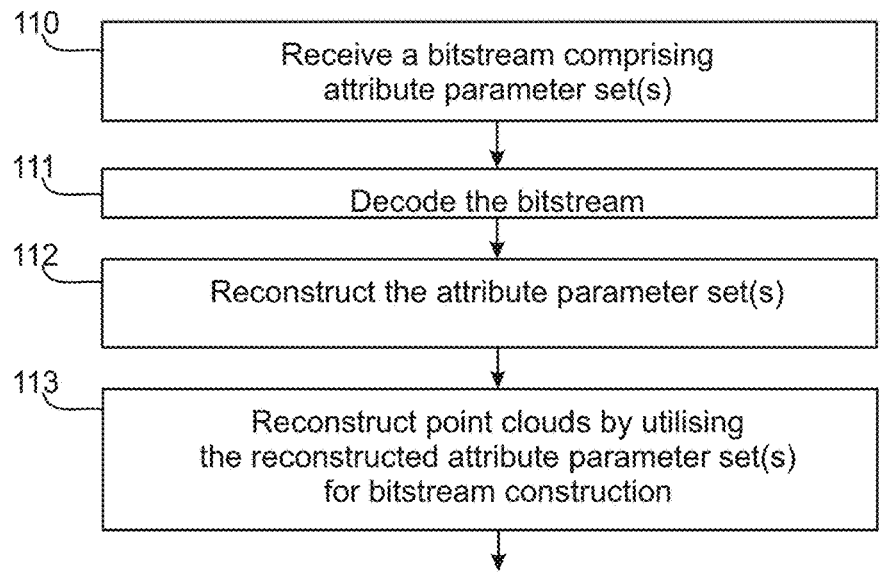
FIG. 10b shows a simplified flow diagram of a processing chain to decode patches, in accordance with an embodiment.

FIGS. 9a and 9b provide an overview of an example of encoding and decoding processes, respectively, FIG. 10a depicts a simplified flow diagram for a possible processing chain to encode attribute information, in accordance with an embodiment, and FIG. 10b shows a simplified flow diagram of a processing chain to decode the attribute information, in accordance with an embodiment.

A point cloud is received by a patch generator 902 in which a patch generation process aims at decomposing the point cloud into a minimum number of patches with smooth boundaries, while also minimizing the reconstruction error. This may be performed by, for example, the following approach.

First, the normal at every point is estimated and an initial clustering of the point cloud is then obtained by associating each point with one of the following six oriented planes, defined by their normals:
(1.0, 0.0, 0.0),
(0.0, 1.0, 0.0),
(0.0, 0.0, 1.0),
(−1.0, 0.0, 0.0),
(0.0, −1.0, 0.0), and
(0.0, 0.0, −1.0).

More precisely, each point is associated with the plane that has the closest normal (e.g. maximizes the dot product of the point normal and the plane normal).

The initial clustering is then refined by iteratively updating the cluster index associated with each point based on its normal and the cluster indices of its nearest neighbors. The final step consists of extracting patches by applying a connected component extraction procedure.

Figure 11:
FIG. 11 illustrates an example of patch packing.
Figure 12:
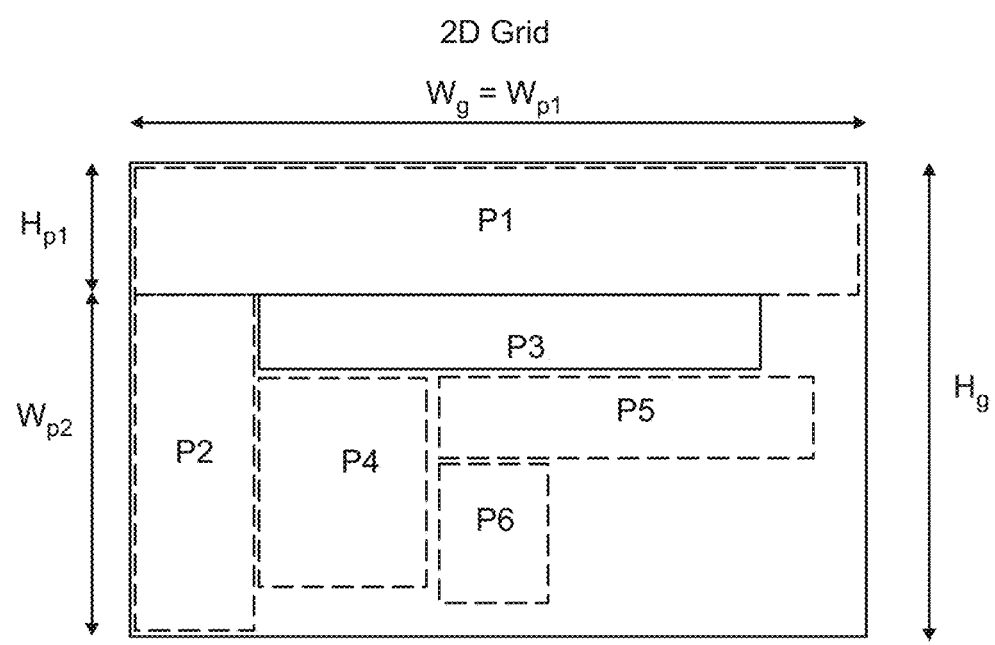
FIG. 12 illustrates an example of forming a grid for patches and arranging the patches in the grid.

The extracted patches are provided to a packing element 904 in which the packing process aims at mapping the extracted patches onto a 2D grid (FIG. 12), while trying to minimize the unused space, and trying to guarantee that every T×T (e.g., 16×16) block of the grid is associated with a unique patch. The parameter T may be a user-defined parameter that is encoded in the bitstream and sent to the decoder. FIG. 11 illustrates an example of packing. In FIG. 11 white areas illustrate empty pixels. The packing element 904 outputs an occupancy map, which may be received by an occupancy map and attributes compression element 916, as will be described later in this specification.

An image generation process performs both a geometry image generation 906 and a texture image generation 908 by applying the 3D to 2D mapping computed during the packing process to store the geometry and texture of the point cloud as images. In order to better handle the case of multiple points being projected to the same pixel, each patch is projected onto one image, which may also be referred to as a layer. More precisely, let H(u,v) be the set of points of the current patch that get projected to the same pixel (u, v). If more than one 3D point is projected to the same location on the current patch, a single value for that location H(u,v) may be selected. The layer stores the point of H(u,v) with the closest distance to its projection surface, e.g. the lowest depth D0. The generated videos may have the following characteristics, for example:
Geometry: width (W)×height (H) YUV420-8 bit,
Texture: width (W)×height (H) YUV420-8 bit,
It should be noted that the geometry video may be monochromatic.

The geometry image and/or the texture image may be padded by an image padding element 910. Padding aims at filling the empty space between patches in order to generate a piecewise smooth image suited for video compression. The image padding element 910 may consider keeping the compression high as well as enabling estimating of occupancy map (EOM) with enough accuracy as compared to the original occupancy map (OOM).

According to an approach, a following padding strategy may be used:
Each block of T×T (e.g., 16×16) pixels is processed independently. If the block is empty (i.e., all its pixels belong to an empty space), then the pixels of the block are filled by copying either the last row or column of the previous T×T block in raster order. If the block is full (i.e., no empty pixels), nothing is done. If the block has both empty and filled pixels, then the empty pixels are iteratively filled with the average value of their non-empty neighbors.

The generated images/layers may be stored as video frames and compressed. For example, the padded geometry image and the padded texture image are provided to a video compression element 912 for compressing the padded geometry image and the padded texture image, from which the compressed geometry and texture images are provided, for example, to a multiplexer 914 which multiplexes the input data to a compressed bitstream(s).

There may also be an occupancy map and attributes compression element 916 for compressing an occupancy map and attributes info and an auxiliary patch information compression element 918 for compressing auxiliary patch information, before providing the compressed occupancy map, attributes and auxiliary patch information to the multiplexer 914.

An occupancy map (OM) informs the decoder which pixels are valid and which pixels are the padded areas in between the patches. The occupancy map may consist of a binary map that indicates for each cell of the grid whether it belongs to the empty space or to the point cloud. One cell of the 2D grid would produce a pixel during the image generation process.

Auxiliary patch information may also be coded for example as follows. The signaling structure of the auxiliary per-patch information may be as follows:
Index of the projection plane
    Index 0 for the planes (1.0, 0.0, 0.0) and (−1.0, 0.0, 0.0)
    Index 1 for the planes (0.0, 1.0, 0.0) and (0.0, −1.0, 0.0)
    Index 2 for the planes (0.0, 0.0, 1.0) and (0.0, 0.0, −1.0).
2D bounding box (u0, v0, u1, v1)
3D location (x0, y0, z0) of the patch represented in terms of depth $\delta 0$, tangential shift s0 and bi-tangential shift r0. According to the chosen projection planes, ($\delta 0$, s0, r0) are computed as follows:
    Index 0, $\delta 0$=x0, s0=z0 and r0=y0
    Index 1, $\delta 0$=y0, s0=z0 and r0=x0
    Index 2, $\delta 0$=z0, s0=x0 and r0=y0
Also, mapping information providing for each T×T block its associated patch index may be encoded as follows:

For each T×T block, let L be an ordered list of the indexes of the patches such that their 2D bounding box contains that block. The order in the list is the same as the order used to encode the 2D bounding boxes. L is called the list of candidate patches.

The empty space between patches is considered as a patch and is assigned the special index 0, which is added to the candidate patches list of all the blocks.

Let I be an index of the patch to which the current T×T block belongs and let J be the position of I in L. Instead of explicitly encoding the index I, its position J is arithmetically encoded instead, which may lead to better compression efficiency.

The occupancy map may consist of a binary map that indicates for each cell of the grid whether it belongs to the empty space or to the point cloud. One cell of the 2D grid would produce a pixel during the image generation process.

An occupancy map compression, if it were implemented, leverages the auxiliary information described above in order to detect the empty T×T blocks (i.e., blocks with the patch index 0). The remaining blocks can be encoded as follows.

The occupancy map could be encoded with a precision of a B0×B0 blocks. B0 is a user-defined parameter. In order to achieve lossless encoding, B0 may need to be set to 1. In practice the parameter values B0=2 or B0=4 may result in visually acceptable results, while significantly reducing the number of bits required to encode the occupancy map.

Figure 7:
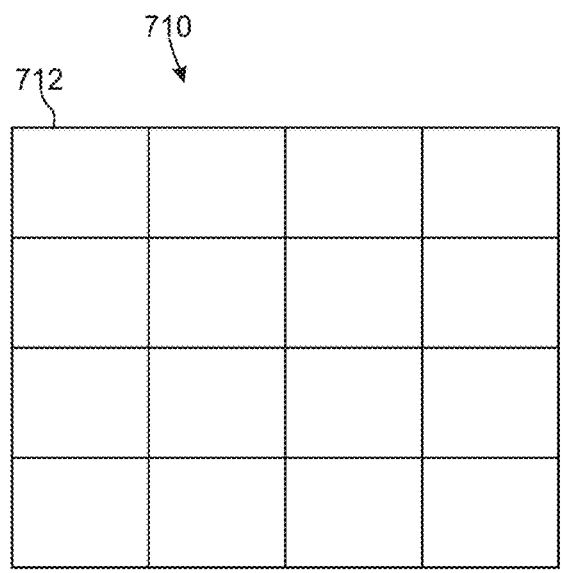
FIG. 7 shows an example of a block divided into sub-blocks.
Figure 8A:
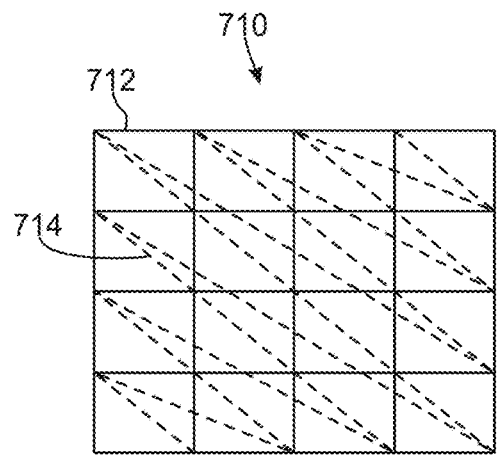
FIGS. 8a to 8d show examples of traversal orders for the sub-blocks of a T×T block.
Figure 8B:
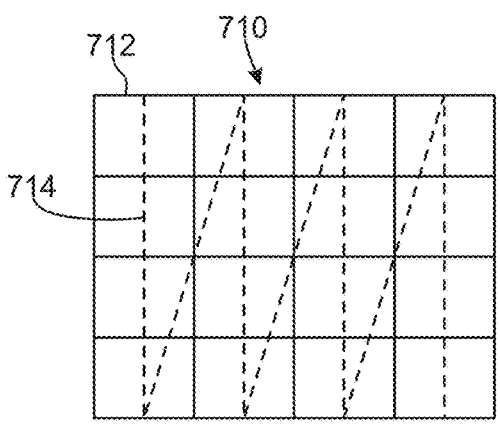
Figure 8C:
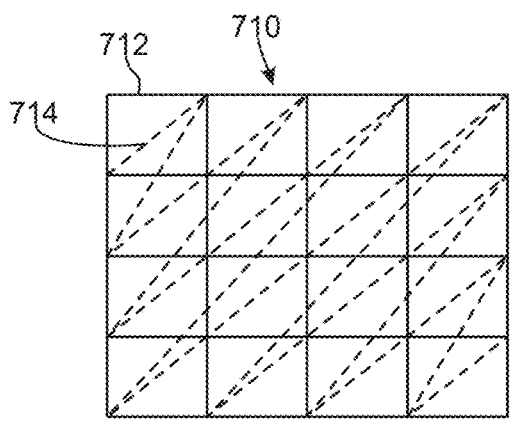
Figure 8D:
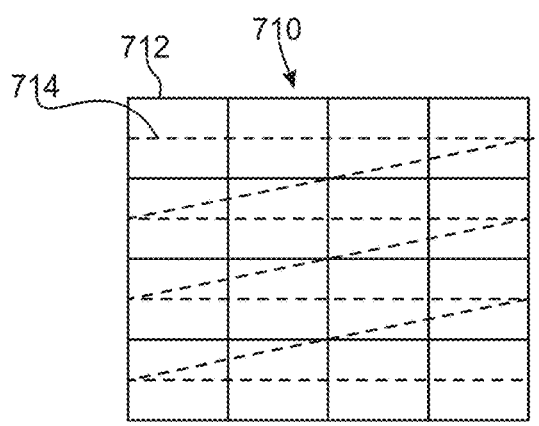

FIG. 7 illustrates an example of the T×T block 710 divided into 16 B0×B0 sub-blocks 712.

The compression process may proceed as follows:

Binary values are associated with B0×B0 sub-blocks 712 belonging to the same T×T block 710. A value 1 is associated with a sub-block, if it contains at least a non-padded pixel, and 0 otherwise. If a sub-block has a value of 1 it is said to be full, otherwise it is an empty sub-block. If all the sub-blocks of a T×T block are full (i.e., have value 1). The block is said to be full. Otherwise, the block is said to be non-full. A binary information is encoded for each T×T block to indicate whether it is full or not. If the block is non-full, an extra information indicating the location of the full/empty sub-blocks may be encoded, for example, as follows:

Different traversal orders are defined for the sub-blocks. FIGS. 8a to 8d show the four considered traversal orders 714, in accordance with an embodiment. The encoder chooses one of the traversal orders 714 and explicitly signals its index in the bitstream. The binary values associated with the sub-blocks may be encoded by using a run-length encoding strategy, for example as follows:

The binary value of the initial sub-block is encoded. Continuous runs of 0s and 1s are detected, while following the traversal order selected by the encoder. The number of detected runs is encoded and the length of each run, except of the last one, is also encoded.

The point cloud geometry reconstruction process exploits the occupancy map information in order to detect non-empty pixels in the geometry/texture images/layers. The 3D positions of the points associated with those pixels are computed by levering the auxiliary patch information and the geometry images. More precisely, in accordance with an approach, the geometry reconstruction process may comprise the following.

Let P be the point associated with the pixel (u, v) and let ($\delta 0$, s0, r0) be the 3D location of the patch to which it belongs and (u0, v0, u1, v1) its 2D bounding box. P could be expressed in terms of depth $\delta(u, v)$, tangential shift s(u, v) and bi-tangential shift r(u, v) as follows:
    $\delta(u, v) = \delta 0 + g(u, v)$
    $s(u, v) = s0 − u0 + u$
    $r(u, v) = r0 − v0 + v$
    where g(u, v) is the luma component of the geometry image.

The smoothing procedure 919 aims at alleviating potential discontinuities that may arise at the patch boundaries due to compression artifacts. According to an approach boundary points are moved to the centroid of their nearest neighbours.

In a texture reconstruction stage texture values may be directly read from the texture images.

One way to compress a time-varying volumetric scene/object, is to project 3D surfaces on to some number of pre-defined 2D planes. Regular 2D video compression algorithms can then be used to compress various aspects of the projected surfaces. For example, a time-varying 3D point cloud, with spatial and texture coordinates, can be mapped into a sequence of at least two sets of planes, where one of the two sets carry the texture data and the other carries the distance of the mapped 3D surface points from the projection planes. Aligned with this, an occupancy map informs the decoder which pixels are valid and which pixels are the padded areas in between the patches.

FIG. 9b depicts some elements of a decoder 930, in accordance with an embodiment. A demultiplexer 932 demultiplexes different information streams to correct decoding elements. The compressed geometry image and the compressed texture images are provided to a video decompression element 934 for decompressing to obtain decompressed geometry image and decompressed texture image. An occupancy map and attributes decompressor 936 is provided with the encoded information of compressed occupancy map and attributes info. The occupancy map decompressor 936 decompresses the attribute fields which comprise the combined occupancy image and attribute image information decodes the difference signal and outputs a decoded difference signal to an occupancy map creator 946. In the occupancy map creator 946, the reconstructed texture image and geometry image are used to estimate the occupancy map based on the similar estimation method selected and signaled in the encoder. Following this, the similar smoothing method signaled from encoder will be applied on the estimated occupancy map to create a smoothed estimated occupancy map in the decoder. Then, the decoded difference signal will be added to the smoothed estimated occupancy map to create a reconstructed occupancy map, which should correspond with the original occupancy map, if the encoding, transmission and decoding did not introduce such errors which could not be eliminated by the decoder. The reconstructed occupancy map can be used in the decoder side as in a conventional decoder. The compressed auxiliary patch information is provided to an auxiliary patch information decompressing element 938 to obtain decompressed auxiliary patch information. A geometry reconstruction element 940 uses the reconstructed occupancy map, decompressed geometry image and the decompressed auxiliary patch information to reconstruct the geometry image. The reconstructed geometry image may be smoothed by a smoothing element 942. A texture reconstruction element 944 uses the decompressed video information and geometry information to reconstruct the texture image.

Certain parameters related to point cloud compression (PCC) such as texture and some other parameters are referred to as attributes in the following description. In the following table some of these attributes are shown:

TABLE 1

| attribute_type | Attribute type |
|---|---|
| 0 | Texture |
| 1 | Normals |
| 2 | Reflectance |
| 3 | Material ID |
| 4 | Transparency |
| 5 . . . 14 | Reserved |
| 15 | User-defined attribute |

In the following, an example of video-based attribute parameter set semantics (V-PCC) are described.

An attribute codec_id indicates an identifier of the codec used to compress the attribute map information.

An attribute attribute_dimension_minus1 indicates the dimension of the attribute (i.e., number of channels) minus one.

An attribute attribute_metadata_present_flag indicates whether attribute meta data is present or not. For example, if the value of the attribute_metadata_present_flag is one, the attribute metadata is present and if the value of the attribute_metadata_present_flag is zero, the attribute metadata is not present.

An attribute attribute_patch_metadata_enabled_flag indicates whether attribute patch metadata may be signaled in the attribute patch parameter set unit or not. For example, attribute_patch_metadata_enabled_flag equal to 1 indicates that attribute patch metadata may be signaled, whereas attribute_patch_metadata_enabled_flag equal to 0 indicates that attribute patch metadata is not signalled.

An attribute attribute_patch_scale_metadata_enabled_flag indicates whether attribute patch scale metadata may be signaled in the attribute patch parameter set unit or not. For example, attribute_patch_scale_metadata_enabled_flag equal to 1 indicates that attribute patch scale metadata may be signaled, whereas attribute_patch_scale_metadata_enabled_flag equal to 0 indicates that attribute patch scale metadata is not signalled.

An attribute attribute_patch_offset_metadata_enabled_flag indicates whether attribute patch offset metadata may be signaled in the attribute patch parameter set unit or not. For example, attribute_patch_offset_metadata_enabled_flag equal to 1 indicates that attribute patch offset metadata may be signaled, whereas attribute_patch_offset_metadata_enabled_flag equal to 0 indicates that attribute patch offset metadata is not signalled.

The V-PCC attribute parameters may be signalled in the attribute_parameter_set, as indicated in the following table:

TABLE 2

| | Descriptor |
|---|---|
| attribute_parameter_set( ) { | |
|   attribute_codec_id | u(8) |
|   attribute_dimension_minus1 | u(8) |
|   if ( attribute_metadata_enabled_flag[ attribute_index ] | |
|     & attributeDataEnabledFlag[ attribute_index ] ) { | |
|     attribute_metadata_present_flag | u(1) |
|     if ( attribute_metadata_present_flag ) { | |
|       attribute_metadata( ) | |
|     } | |
|   } | |
|   attribute_patch_metadata_enabled_flag | u(1) |
|   if ( attribute_patch_metadata_enabled_flag ) { | |
|     attribute_patch_scale_metadata_enabled_flag | u(1) |
|     attribute_patch_offset_metadata_enabled_flag | u(1) |
|   } | |
|   byte_alignment( ) | |
| } | |

The attribute_parameter_set itself may be a part of the video-based attribute parameter set bitstream, an example of which is shown in FIG. 11.

Attribute parameter metadata may be signaled on an access unit level, as described above in the attribute_parameter_set, or, to allow for more frequent updates, on a patch level as attribute_patch_parameter_set for individual patches identified by the patch_id attribute. An example of the attribute_patch_parameter_set is depicted in Table 3 below:

TABLE 3

| | Descriptor |
|---|---|
| attribute_patch_parameter_set( ) { | |
|   patch_id | u(32) |
|   if( attribute_patch_metadata_enabled_flag ) { | |
|     attribute_patch_metadata_present_flag | u(1) |
|     if( attribute_patch_metadata_present_flag ) { | |
|       attribute_patch_metadata( ) | |
|     } | |
|   } | |
|   byte_alignment( ) | |
| } | |

In the following, an example of a decoding process, which may be applied on the attributes and attribute patch parameter sets, will be described.

First, an attribute(s) parameter set decoding process is described.

Input to this process to a decoder is a bitstream corresponding to attribute(s) parameter set. The bitstream may comprise the following parameters in an encoded form: codec_id and an attribute_dimension_minus1. When the attribute_dimension_minus1 parameter has been reconstructed by decoding, the attribute_dimension parameter may be derived by adding one to the parameter value, i.e. attribute_dimension=attribute_dimension_minus1+1.

The decoder also decodes the parameters attribute_metadata_enabled_flag and attribute_metadata_present_flag and examines their reconstructed (decoded) values. If the reconstructed syntax elements attribute_metadata_enabled_flag and attribute_metadata_present_flag are equal to 1, the syntax structure attribute_metadata( ) for the representation of attribute parameter set is also decoded.

If syntax elements attribute_smoothing_metadata_enabled_flag and attribute_smoothing_metadata_present_flag are equal to 1, the following set of syntax elements is decoded:
  attribute_smoothing_radius_to_smoothing
  attribute_smoothing_neighbor_count_smoothing
  attribute_smoothing_radius2_boundary_detection
  attribute_smoothing_threshold_smoothing
  attribute_smoothing_threshold_local_entropy
  attribute_scale_metadata[d] with d=0 . . . attribute_dimension_minus1

If syntax elements attribute_offset_metadata_enabled_flag and attribute_offset_metadata_present_flag are equal to 1, the set of syntax elements attribute_offset_metadata[d], are decoded, where the value of d is from 0 to attribute_dimensions−1.

Next, an attribute(s) patch parameter set decoding process is described.

Input to this process is a bitstream corresponding to attribute(s) patch parameter set. The decoder decodes the codec_id parameter and if the decoded parameter attribute_patch_metadata_enabled_flag indicates that attribute patch metadata has been enabled and included in the bitstream (e.g. attribute_patch_metadata_enabled_flag=1), the attribute_patch_metadata_present_flag is decoded. If the value of the attribute_patch_metadata_present_flag parameter is equal to 1, the syntax structure attribute_patch_metadata( ) representing attribute patch parameter set is decoded for the following syntax elements. If the value of the attribute_patch_scale_metadata_enabled_flag parameter is equal to 1, then the parameters attribute_patch_scale_metadata[d] are decoded, where the value of d is from 0 to attribute_dimensions−1. Furthermore, if the value of the attribute_patch_offset_metadata_present_flag parameter is equal to 1, then the parameters attribute_patch_offset_metadata[d] are decoded, where the value of d is from 0 to attribute_dimensions−1.

In accordance with an approach, it may be possible to define the type of attributes as texture, normal, reflectance, material ID and transparency. However, there are other types of attributes which should be considered for point cloud compression and are not currently supported in the current specification of point cloud compression. The introduction of such attribute types allowed better defining the presentation and higher quality content rendering to the end user.

If one or more of the above mentioned other types of attributes are not utilized, the content may be rendered with less natural presentation compared to the cases where those attribute types are defined and used.

Moreover, currently, the attributes occupy a considerable amount of bitrate and hence a bitrate reduction in compression of attributes may be needed. Currently, attributes are either defined per access point or per patch. While the first approach is more efficient in terms of bitrate requirements, the second approach is more flexible to allow for better content adaption. Overall a combination of the two approaches could reduce the required bitrate to encode the said attribute while still maintaining signalling flexibility, e.g. signalling the frame range for which a certain attribute information is valid.

In the following, some new attribute types are introduced to be added to the current attribute type list, which may enable a renderer to create more natural looking and higher quality content as compared to the original content or to better presence the visual quality of the content as similar as what could have been perceived by a user in natural life.

The attributes to be introduced and explained in more detail in the following are smoothness/roughness, specular amount, surface albedo, bidirectional reflectance distribution function (BRDF), bidirectional scattering distribution function (BSDF), bidirectional scattering-surface reflectance distribution function (BSSRDF), bidirectional transmittance distribution function (BTDF), opacity, and translucency. These parameters mainly relate to radiation properties of the surface i.e. what kind of effect the surface causes to radiation arriving on the surface. These effects will be described in more detail in the following.

The specular value (amount) attribute refers to the reflection of very bright light sources on a surface. This means how strongly and largely the bright light source is reflected from that surface. Some examples of such reflection with different specular values are presented in FIGS. 14a-14c. In the example of FIG. 14a a high specular value is assumed because the reflection is quite strong and the area caused by the reflection is quite large. In the example of FIG. 14b a medium specular value is assumed because the reflection is not so strong than in the example of FIG. 14a and also the area caused by the reflection is quite smaller. In the example of FIG. 14b a small specular value is assumed because the reflection is quite weak and the area caused by the reflection is much smaller than in the example of FIG. 14a and also smaller than in the example of FIG. 14b.

The illumination direction attribute refers to the direction of illumination defined in the scene. This means, if there are one or more sources of light, the angle and strength of the light source is defined in the illumination direction attribute. This may help the renderer to render the content as much natural as possible to what could have been perceived in the scene.

The smoothness/roughness attribute defines the material surface structure. The smoothness attribute refers to the fact that most of the surfaces are different from each other. Some are very smooth, and some are very rough. Such criteria is different from reflectance value of a surface as smoothness refers to the structure of the surface and not only how much the light is reflected. For example, a sandpaper having different grit sizes can be considered. It may go from very fine grit to a coarser grit. Such presentation of the surface can be defined with smoothness attribute. Similarly, for a towel or carpet, depending on the length of textile on the surface of such towel or carpets, the smoothness value differs. It should be noted that smoothness does not directly indicate reflectance i.e. how much light is reflected from the surface. For example, two different surfaces which have the same smoothness value may have largely different reflection properties to incoming light radiation. This may be due to the material of the surface.

The blurry reflection value attribute refers to the criteria on how the reflection should be handled on a surface. If defined, this attribute value may clarify how blurry the reflectance on the surface should be.

The surface albedo is defined as the ratio of irradiance reflected to the irradiance received by a surface. A surface with a high albedo value reflects a large amount of the incoming radiation, i.e. light. FIGS. 15a and 15b illustrate examples of surfaces having different reflectance values depending on the surface albedo. As an example, e.g. a high albedo surface might reflect 80% or more of incoming radiation (FIG. 15a) and a low albedo surface might reflect only 10% or less of incoming radiation (FIG. 15b). In accordance with another embodiment, the limit between high and low albedo could be 50%, wherein a high albedo surface might reflect 50% or more of incoming radiation and a low albedo surface might reflect 50% or less of incoming radiation. In accordance with yet another embodiment, there could also be a surface albedo which is not categorized as high or low albedo, but in between high and low albedo. As an example, if the reflectance is lower than an upper reflectance limit (e.g. 80%) but higher than a lower reflectance limit (e.g. 10%), then the surface albedo could be classified as neutral.

All the above mentioned four bidirectional functions, i.e. the bidirectional reflectance distribution function, the bidirectional scattering distribution function, the bidirectional scattering-surface reflectance distribution function and the bidirectional transmittance distribution function describe various (bi)-directional aspects of light rays interacting with a surface. For example, FIGS. 16a to 16c show three different effects based on the bidirectional reflectance distribution function. In FIG. 16a an example of a surface producing diffuse reflection is illustrated, in FIG. 16b an example of a surface producing glossy reflection is illustrated, and in FIG. 16c an example of a surface producing mirror reflection is illustrated.

The bidirectional scattering distribution function is a combination of the bidirectional reflectance distribution function and the bidirectional transmittance distribution function, as shown in FIG. 17a. The bidirectional scattering-surface reflectance distribution function also includes sub-surface scattering, i.e. extends the bidirectional reflectance distribution function (FIG. 17b) with sub surface scattering, as shown in FIG. 17c.

All bidirectional functions may be defined as a function of incoming (light source) and outgoing (viewpoint) light angle.

The opacity attribute is the coordinate term for transparency. While transparency defines how much light is allowed through a surface, opacity defines how much light is blocked by a surface.

The translucency attribute defines how light is scattered in a not fully transparent surface.

In the following, some embodiments are described to show how and possibly when the value of an attribute may be defined and signaled by an encoder to a decoder. It should be noted that in the following embodiments, only one attribute is calculated while it is possible to define more than one attribute per block of pixels, patch, or group of frames. In the case where there are more than one attribute defined, the redundancy/similarity between the representations of attributes may be taken into account to encode them more efficiently.

In accordance with one embodiment, the encoder processes image information as a block basis wherein the attribute value is signaled per block of pixels in each patch. This means that the attribute value per block of pixels in one patch is calculated based on the content which is covered by that block of pixels. Such attribute value may refer to mean, median, maximum or minimum attribute value of pixels in that block of pixel. It should be noted that the block sizes may not be identical meaning that the blocks of pixels may be of rectangular shape or square shape and different blocks may have different width and height.

In accordance with another embodiment, the attribute value is signaled per patch. This means, one attribute value per patch is calculated and signaled in the patch header. This value may be the mean, median, maximum or minimum attribute value of different blocks in the patch.

In accordance with another embodiment, only a residual between a previous and a current attribute value or attribute index per block of pixels in a patch or per patch is signaled to reduce bitrate requirements further.

In accordance with another embodiment, the attribute value may be signaled per a region of interest (ROI) in the patch. This means that the patch is divided into different regions of interests and then for each region of interest the attribute value is calculated and signaled.

In accordance with another embodiment, the patch content is segmented to different regions and for each segment a respective attribute value is calculated and signaled. This is similar to calculating and signaling the attribute value per a region of interest while in this case the region of interest is defined based on any segmentation algorithm.

In accordance with an embodiment, the attribute value is signaled as a look-up-table index, either per block of pixels in a patch, or per patch. The look-up table which comprises attribute values which may need to be signaled may be signaled in or along the bitstream. In accordance with an embodiment, such look-up table may have been stored into a decoder beforehand. Such an approach using one or more look-up tables may be especially useful if there is only a limited number of different surface attribute values, as bitrate requirements for signaling an index may be much lower than signaling the attribute value itself. It should be noted here that the look-up table approach may be used in context of the above-mentioned embodiments where the attribute value is indicated to be signaled. Hence, the attribute value is not signaled but the index to the look-up table which indicates the value of the attribute.

In accordance with an embodiment, the three-dimensional content is segmented in three dimensions and one attribute value is calculated and signaled for each segment.

In accordance with another embodiment, the three-dimensional content is divided to different objects, and the attributes are defined for each object and the attribute values are calculated for the whole object, considering the criteria and structure of the object.

In accordance with another embodiment, the structure of the content in three dimensions is considered. Any continuous surface would be considered to have similar attribute value(s). For example, if a table surface is recognized in the scene, then the whole surface may share one or more attribute values. While the side of the table may have different characteristics and hence, have a different set of attributes assigned to it. For example, a table can have a very reflecting surface and rough edges.

In accordance with another embodiment, a set of attribute values are defined for different kinds of shapes. Then, if the encoder recognizes that a 3D scene comprises one or more such previously known shapes, the encoder may use a corresponding set of attribute values for each said specific shape(s).

All of the above-mentioned attribute definition methods refer to the fact that the attributes are defined for a single moment of time (a time stamp) and are updated for the next moment of time (the next time stamp). In the following, different embodiments are introduced where the definition of attribute(s) value(s) is based on temporal content change and characteristics of objects in different consecutive frames.

In this section, the referred attribute value may be calculated based on any of the aforementioned embodiments. Therefore, in the following, it is only considered that an attribute value is already defined for the current patch/frame in one moment of time and similar value is also available for the other patches/frames in other moments of time. Therefore, the following embodiments describe how the attribute values may be defined based on the available attribute values considering temporal similarities of the said attribute values in different moments of time.

In accordance with an embodiment, a group of pixels (GOP) in considered. Said group of pixels may be defined by the encoder used to encode the attributes. Values of the attributes for each frame are taken into account and a single attribute value will be defined for the whole group of pixels. The definition may be based on the mean, median, minimum or maximum or any other weighted average value of the in hand attribute values. The single attribute value will be used in all moments of time and that refers to the same block, patch, object or another entity for which the attribute value is valid. If the object has moved in the scene, the attribute value may follow the movement of the object. Similarly, if one attribute value is calculated for one block of pixels in a patch, the value may follow the content which is presented by the block of pixels. However, it may happen that the content of the patch or block of pixels in the patch does not have any movement during short durations of time and hence, the same attribute value is used for same location of block of pixels.

In accordance with another embodiment, similar to having the same attribute for a group of pixels, a single attribute may be defined between the scene cuts or camera movements. Alternatively, the single attribute may be used between the moments of time where the projection surfaces are defined i.e. when the location and/or orientation of the projection surfaces are re-defined, then the attributes are to be defined again too.

In accordance with another embodiment, the attribute values are defined per a group of pixels where the group of pixels at different times may have different sizes. The size of the group of pixels may be defined based on content. In other words, if an object enters the scene or is vanished, then the group of pixels size may change accordingly. Alternatively, if the characteristics of a surface or object changes during the time (e.g. a dirty mirror is cleaned in the scene) then the group of pixels for the attribute(s) related to that part of the scene are defined based on alignment with the characteristics and status of that part of the scene. In another embodiment, the group of pixels may be defined based on the illumination changes in the scene. This means if an illumination source has been added (turned on) in the scene, then the group of pixels will be defined accordingly. All said embodiments to define the group of pixels length, try to increase the similarities of the attribute values during the group of pixels for that specific part of the scene.

It should be noted that the group of pixels for which the attributes are defined may differ for different attributes and also for different parts of the scene. For example, two attributes for one object may have different group of pixels size. Moreover, different attributes associated with different parts of the scene may have different group of pixels sizes.

In accordance with another embodiment, a set of different attribute types are combined to an attribute superset, e.g. combining smoothness, albedo and bidirectional scattering-surface reflectance distribution function to describe the surface attribute for all "skin" patches of the same object.

It should be noted that different attributes related to a specific part of the object may not necessarily have to be defined in the same manner. In other words, some attributes may be defined in the block level, some may be defined in patch level, and some in other levels. However, it may be beneficial from compression point of view to have similar way to define the attributes for any specific part of the object.

Utilizing one or more of the above described embodiments may enable that less information needs to be transmitted for the attributes i.e. reduction of bitrate may be achieved. It may also be possible to define the surface characteristics of the scene more accurately enabling better and more accurate rendering of the content. This is due to the fact that the attributes try to better imitate the characteristics of the objects in the scene when perceived in the real world.

Figure 18A:
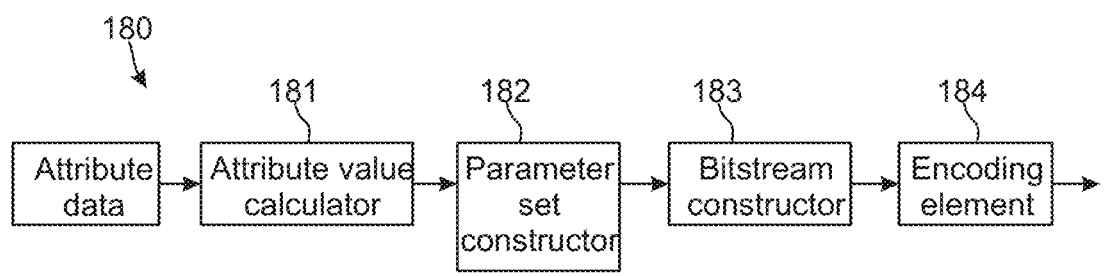
FIG. 18a illustrates an example of an encoding element.

In the following, the operation at an encoder side for encoding the attribute data is explained in more detail with reference to the block diagram of FIG. 18a and the flow diagram of FIG. 10a. An encoding element 180 receives attribute data of an encoding entity, such as a block of pixels, a patch, or a group of frames (the block 100 in FIG. 10a). An attribute value calculation element 181 calculates 101 a combined attribute value for each attribute type to be encoded. For example, the attribute value calculation element 181 calculates an average of attribute values in the encoding entity, e.g. in a block of pixels. As another option, the combined value may be the median, the maximum or the minimum value. This process may be performed for each attribute type to be signaled in the same encoding unit. The combined attribute value(s) are provided 102 to a parameter set constructor 182 which forms 103 the attribute parameter set. The attribute parameter set is provided 104 to a bitstream constructor 183 which forms 105 a bitstream in which inter alia the attribute parameter set(s) may be included. The attribute parameter set(s) may be formed, for example, according to Table 2 presented above in this specification.

FIG. 13 illustrates an example of a part of a video point cloud compression bitstream 130. The video point cloud compression bitstream 130 comprises several V-PCC units 131. Each V-PCC unit 131 comprises a V-PCC header 132 and a V-PCC payload 133. FIG. 13 also illustrates several options 134 of the V-PCC payload, such as a sequence parameter set, an occupancy parameter set, a geometry patch parameter set, attribute parameter set, a data unit such as an occupancy video data unit, a geometry video data unit or an attribute video data unit . . . . The bitstream may be encoded 106 by the bitstream encoding element 184 and transmitted to a decoder, for example. The bitstream encoding element 184 may, for example, compress the bitstream to further reduce required bitrate.

Figure 18B:
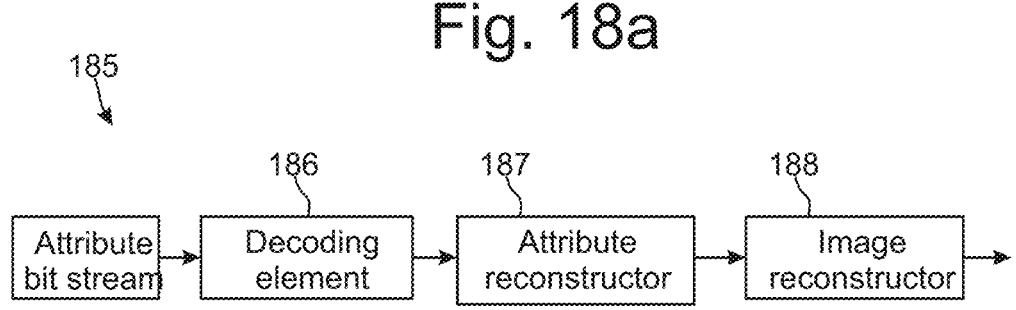
FIG. 18b illustrates an example of a decoding element.

In the following, the operation at a decoder side is explained in more detail with reference to the block diagram of FIG. 18b and the flow diagram of FIG. 10b. A decoding element 185 receives a bitstream (the block 110 in FIG. 10b) and a decoding element 186 decodes 111 the bitstream to reconstruct the encoded information from the bitstream. The decoded information may comprise e.g. V-PCC units 131. An attribute reconstructor 187 uses this information to reconstruct 112 the attribute parameter set(s) which the bitstream may comprise. The reconstructed parameter set(s) may then be used to reconstruct 113 point clouds and further volumetric video by an image reconstructor 188.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signaled at CU level whether prediction error coding is applied or not for each CU. In the case there is no prediction error residual associated with the CU, it can be considered there are no TUs for the said CU. The division of the image into CUs, and division of CUs into PUs and TUs is typically signaled in the bitstream allowing the decoder to reproduce the intended structure of these units.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

A motion-constrained tile set (MCTS) is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set. Additionally, the encoding of an MCTS is constrained in a manner that motion vector candidates are not derived from blocks outside the MCTS. This may be enforced by turning off temporal motion vector prediction of HEVC, or by disallowing the encoder to use the TMVP candidate or any motion vector prediction candidate following the TMVP candidate in the merge or AMVP candidate list for PUs located directly left of the right tile boundary of the MCTS except the last one at the bottom right of the MCTS. In general, an MCTS may be defined to be a tile set that is independent of any sample values and coded data, such as motion vectors, that are outside the MCTS. In some cases, an MCTS may be required to form a rectangular area. It should be understood that depending on the context, an MCTS may refer to the tile set within a picture or to the respective tile set in a sequence of pictures. The respective tile set may be, but in general need not be, collocated in the sequence of pictures.

It is noted that sample locations used in inter prediction may be saturated by the encoding and/or decoding process so that a location that would be outside the picture otherwise is saturated to point to the corresponding boundary sample of the picture. Hence, if a tile boundary is also a picture boundary, in some use cases, encoders may allow motion vectors to effectively cross that boundary or a motion vector to effectively cause fractional sample interpolation that would refer to a location outside that boundary, since the sample locations are saturated onto the boundary. In other use cases, specifically if a coded tile may be extracted from a bitstream where it is located on a position adjacent to a picture boundary to another bitstream where the tile is located on a position that is not adjacent to a picture boundary, encoders may constrain the motion vectors on picture boundaries similarly to any MCTS boundaries.

The temporal motion-constrained tile sets SEI message of HEVC can be used to indicate the presence of motion-constrained tile sets in the bitstream.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired coding mode for a block and associated motion vectors. This kind of cost function uses a weighting factor $\lambda$ to tie together the (exact or estimated) image distortion due to lossy coding methods and the (exact or estimated) amount of information that is required to represent the pixel values in an image area:

$$C=D+\lambda R, \tag{1}$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring CU may be regarded as unavailable for intra prediction, if the neighboring CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. The abbreviation TID may be used to interchangeably with the TemporalId variable. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to tid_value does not use any picture having a TemporalId greater than tid_value as inter prediction reference.

NAL units can be categorized into Video Coding Layer (VCL) NAL units and non-VCL NAL units. VCL NAL units are typically coded slice NAL units. In HEVC, VCL NAL units contain syntax elements representing one or more CU.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

Out-of-band transmission, signaling or storage can additionally or alternatively be used for other purposes than tolerance against transmission errors, such as ease of access or session negotiation. For example, a sample entry of a track in a file conforming to the ISO Base Media File Format may comprise parameter sets, while the coded data in the bitstream is stored elsewhere in the file or in another file.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

In HEVC, there are two types of SEI NAL units, namely the suffix SEI NAL unit and the prefix SEI NAL unit, having a different nal_unit_type value from each other. The SEI message(s) contained in a suffix SEI NAL unit are associated with the VCL NAL unit preceding, in decoding order, the suffix SEI NAL unit. The SEI message(s) contained in a prefix SEI NAL unit are associated with the VCL NAL unit following, in decoding order, the prefix SEI NAL unit.

A coded picture is a coded representation of a picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units. Said specified classification rule may for example associate pictures with the same output time or picture output count value into the same access unit.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

In H.264/AVC, a coded video sequence is defined to be a sequence of consecutive access units in decoding order from an IDR access unit, inclusive, to the next IDR access unit, exclusive, or to the end of the bitstream, whichever appears earlier.

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be defined as an access unit in which the base layer picture is an IRAP picture. The value of NoRaslOutputFlag is equal to 1 for each IDR picture, each BLA picture, and each IRAP picture that is the first picture in that particular layer in the bitstream in decoding order, is the first IRAP picture that follows an end of sequence NAL unit having the same value of nuh_layer_id in decoding order. There may be means to provide the value of HandleCraAsBlaFlag to the decoder from an external entity, such as a player or a receiver, which may control the decoder. HandleCraAsBlaFlag may be set to 1 for example by a player that seeks to a new position in a bitstream or tunes into a broadcast and starts decoding and then starts decoding from a CRA picture. When HandleCraAsBlaFlag is equal to 1 for a CRA picture, the CRA picture is handled and decoded as if it were a BLA picture.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may start from an IDR picture. In HEVC a closed GOP may also start from a BLA_W_RADL or a BLA_N_LP picture. An open GOP coding structure is potentially more efficient in the compression compared to a closed GOP coding structure, due to a larger flexibility in selection of reference pictures.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

Several candidate motion vectors may be derived for a single prediction unit. For example, motion vector prediction HEVC includes two motion vector prediction schemes, namely the advanced motion vector prediction (AMVP) and the merge mode. In the AMVP or the merge mode, a list of motion vector candidates is derived for a PU. There are two kinds of candidates: spatial candidates and temporal candidates, where temporal candidates may also be referred to as TMVP candidates.

A candidate list derivation may be performed for example as follows, while it should be understood that other possibilities may exist for candidate list derivation. If the occupancy of the candidate list is not at maximum, the spatial candidates are included in the candidate list first if they are available and not already exist in the candidate list. After that, if occupancy of the candidate list is not yet at maximum, a temporal candidate is included in the candidate list. If the number of candidates still does not reach the maximum allowed number, the combined bi-predictive candidates (for B slices) and a zero motion vector are added in. After the candidate list has been constructed, the encoder decides the final motion information from candidates for example based on a rate-distortion optimization (RDO) decision and encodes the index of the selected candidate into the bitstream. Likewise, the decoder decodes the index of the selected candidate from the bitstream, constructs the candidate list, and uses the decoded index to select a motion vector predictor from the candidate list.

In HEVC, AMVP and the merge mode may be characterized as follows. In AMVP, the encoder indicates whether uni-prediction or bi-prediction is used and which reference pictures are used as well as encodes a motion vector difference. In the merge mode, only the chosen candidate from the candidate list is encoded into the bitstream indicating the current prediction unit has the same motion information as that of the indicated predictor. Thus, the merge mode creates regions composed of neighbouring prediction blocks sharing identical motion information, which is only signaled once for each region.

Texture picture(s) and the respective geometry picture(s) may have the same or different chroma format.

Depending on the context, a pixel may be defined to be a sample of one of the sample arrays of the picture or may be defined to comprise the collocated samples of all the sample arrays of the picture.

Projecting 3D data onto 2D planes is independent from the 3D scene model representation format. There exist several approaches for projecting 3D data onto 2D planes, with the respective signaling. For example, there exist several mappings from spherical coordinates to planar coordinates, known from map projections of the globe, and the type and parameters of such projection may be signaled. For cylindrical projections, the aspect ratio of height and width may be signaled.

In the above, some embodiments have been described with reference to encoding. It needs to be understood that said encoding may comprise one or more of the following: encoding source image data into a bitstream, encapsulating the encoded bitstream in a container file and/or in packet(s) or stream(s) of a communication protocol, and announcing or describing the bitstream in a content description, such as the Media Presentation Description (MPD) of ISO/IEC 23009-1 (known as MPEG-DASH) or the IETF Session Description Protocol (SDP). Similarly, some embodiments have been described with reference to decoding. It needs to be understood that said decoding may comprise one or more of the following: decoding image data from a bitstream, decapsulating the bitstream from a container file and/or from packet(s) or stream(s) of a communication protocol, and parsing a content description of the bitstream, In the above, some embodiments have been described with reference to encoding or decoding texture pictures, geometry pictures (e.g. depth pictures), and/or projection geometry information into or from a single bitstream. It needs to be understood that embodiments can be similarly realized when encoding or decoding texture pictures, geometry pictures, and/or projection geometry information into or from several bitstreams that are associated with each other, e.g. by metadata in a container file or media presentation description for streaming.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, Long Term Evolution wireless communication technique (LTE) and any similar wireless communication technology. A communications device involved in implementing various embodiments of the present invention may communicate using various media including, but not limited to, radio, infrared, laser, cable connections, and any suitable connection.

Although the above examples describe embodiments of the invention operating within a wireless communication device, it would be appreciated that the invention as described above may be implemented as a part of any apparatus comprising a circuitry in which radio frequency signals are transmitted and received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. An apparatus comprising:
   at least one processor; and
   at least one non-transitory memory including computer program code; wherein the at least one memory and the computer program code are configured to, with the at least one processor, cause the apparatus to at least:
   obtain one or more patches comprising information of an object in a three-dimensional scene;
   form an attribute parameter set on the basis of visual properties of a surface of the object in the three-dimensional scene;
   wherein the attribute parameter set is formed to describe a smoothness or roughness of the surface of the object;
   wherein the description of the smoothness or roughness of the surface of the object comprises a value that at least partially indicates whether a difference between a first surface normal of a first region of the object and a second surface normal of a second region of the object is within a threshold;
   form an indication that the attribute parameter set relates to visual properties of the surface of the object;
   signal the indication that the attribute parameter set relates to visual properties of the surface of the object at least partially within at least one syntax element that indicates that the attribute parameter set is formed to describe the smoothness or roughness of the surface of the object; and
   form an indication on a range for which the attribute parameter set is valid.

2. The apparatus of claim 1, wherein the at least one memory and the computer program code are configured to, with the at least one processor, cause the apparatus to at least perform one of the following:
   calculate an average of values of an attribute within the range;
   select a median of the values of the attribute within the range;
   select a maximum of the values of the attribute within the range; or
   select a minimum of the values of the attribute within the range.

3. The apparatus of claim 1, wherein the at least one memory and the computer program code are configured to, with the at least one processor, cause the apparatus to at least:
   signal attribute values per block of pixels in each patch.

4. The apparatus of claim 1, wherein the at least one memory and the computer program code are configured to, with the at least one processor, cause the apparatus to at least:
   segment content of the one or more patches to different regions; and
   calculate and signal for each segment a respective attribute value.

5. The apparatus of claim 1, wherein the range for which the attribute parameter set is valid is one of a block of pixels, a patch, or a group of frames.

6. The apparatus of claim 1, wherein the attribute parameter set comprises one or more attributes indicating one or more of the following visual properties of the surface of the object:
   the smoothness or roughness;
   specular amount;
   surface albedo;
   bidirectional reflectance distribution function;
   bidirectional scattering distribution function;

bidirectional scattering-surface reflectance distribution function;
bidirectional transmittance distribution function;
opacity; or
translucency.

7. The apparatus of claim 1, wherein the at least one memory and the computer program code are configured to, with the at least one processor, cause the apparatus to at least:
combine a set of different attribute types to an attribute superset, the attribute superset describing the visual properties of the surface of the object in the three-dimensional scene.

8. The apparatus of claim 7, wherein the attribute superset comprises smoothness, albedo and a bidirectional scattering-surface reflectance distribution function to describe a surface attribute for patches of the object, the surface attribute describing anatomical skin.

9. The apparatus of claim 1, wherein the at least one memory and the computer program code are configured to, with the at least one processor, cause the apparatus to at least:
signal the attribute values as a residual between a previous attribute value and a current attribute value;
signal the attribute values as a residual between at least one previous attribute index value and at least one current attribute index value; or
signal the attribute values as indexes to a look-up table.

10. The apparatus of claim 1, wherein the at least one memory and the computer program code are configured to, with the at least one processor, cause the apparatus to at least:
encode and signal the attribute parameter set into or along a bitstream.

11. The apparatus of claim 1, wherein the attribute parameter set is formed to describe albedo of the surface of the object, and the indication that the attribute parameter set relates to visual properties of the surface of the object comprises, at least partially, a syntax element that indicates that the attribute parameter set is formed to describe the albedo of the surface of the object.

12. The apparatus of claim 1, wherein the at least one memory and the computer program code are configured to, with the at least one processor, cause the apparatus to at least:
signal an information element to indicate the presence of the indication that the attribute parameter set relates to visual properties of the surface of the object;
wherein the indication that the attribute parameter set relates to visual properties of the surface of the object is configured to be decoded in response to the flag indicating the presence of the indication that the attribute parameter set relates to visual properties of the surface of the object.

13. The apparatus of claim 1, wherein the attribute parameter set is formed to describe an effect the surface of the object causes to radiation arriving on the surface of the object.

14. A method comprising:
obtaining one or more patches comprising information of a three-dimensional scene;
forming an attribute parameter set on the basis of visual properties of a surface of an object in the three-dimensional scene;
wherein the attribute parameter set is formed to describe a smoothness or roughness of the surface of the object;
wherein the description of the smoothness or roughness of the surface of the object comprises a value that at least partially indicates whether a difference between a first surface normal of a first region of the object and a second surface normal of a second region of the object is within a threshold;
forming an indication that the attribute parameter set relates to visual properties of the surface of the object;
signaling the indication that the attribute parameter set relates to visual properties of the surface of the object at least partially within at least one syntax element that indicates that the attribute parameter set is formed to describe the smoothness or roughness of the surface of the object; and
forming an indication on a range for which the attribute parameter set is valid.

15. The method of claim 14, further comprising:
calculating an average of values of an attribute within the range;
selecting a median of the values of the attribute within the range;
selecting a maximum of the values of the attribute within the range; and
selecting a minimum of values of an attribute within the range.

16. The method of claim 14, further comprising:
signaling attribute values of the attribute parameter set per block of pixels in each patch;
signaling the attribute values as a residual between a previous attribute value and a current attribute value;
signaling the attribute values as a residual between at least one previous attribute index value and at least one current attribute index value;
signaling the attribute values per a region of interest; or
signaling the attribute values as indexes to a look-up table.

17. The method of claim 14, further comprising:
segmenting content of the one or more patches to different regions; and
calculating and signaling for each segment a respective attribute value.

18. An apparatus comprising:
at least one processor; and
at least one non-transitory memory including computer program code;
wherein the at least one memory and the computer program code are configured to, with the at least one processor, cause the apparatus to at least:
receive an information element carrying an attribute parameter set, which relates to one or more patches comprising information of a three-dimensional scene;
wherein the attribute parameter set has been formed to describe a smoothness or roughness of the surface of an object in the three-dimensional scene;
wherein the description of the smoothness or roughness of the surface of the object comprises a value that at least partially indicates whether a difference between a first surface normal of a first region of the object and a second surface normal of a second region of the object is within a threshold;
examine an indication to determine whether the attribute parameter set has been formed on the basis of visual properties of the surface of the object in the three-dimensional scene;
decode the indication of whether the attribute parameter set has been formed on the basis of visual properties of the surface of the object at least partially from at least one syntax element that indicates that the attribute parameter set has been formed to describe the smoothness or roughness of the surface of the object; and use the attribute parameter set to reconstruct the three-dimensional scene, in response to the examination revealing that the attribute parameter set has been formed on the basis of visual properties of the surface of the object.

19. The apparatus of claim 18, wherein the at least one memory and the computer program code are configured to, with the at least one processor, cause the apparatus to at least:

examine a range for which the attribute parameter set is valid.

20. The apparatus of claim 18, wherein the at least one memory and the computer program code are configured to, with the at least one processor, cause the apparatus to at least:

receive attribute values per block of pixels in each patch;

receive the attribute values as a residual between a previous attribute value and a current attribute value;

receiving the attribute values as a residual between at least one previous attribute index value and at least one current attribute index value;

receive the attribute values per a region of interest; or receive the attribute values as indexes to a look-up table.

21. The apparatus of claim 18, wherein the attribute parameter set comprises one or more attributes indicating one or more of the following visual properties of the surface of the object:

the smoothness or roughness;

specular amount;

surface albedo;

bidirectional reflectance distribution function;

bidirectional scattering distribution function;

bidirectional scattering-surface reflectance distribution function;

bidirectional transmittance distribution function;

opacity; or translucency.

22. A method comprising:

receiving an information element carrying an attribute parameter set, which relates to one or more patches comprising information of a three-dimensional scene;

wherein the attribute parameter set has been formed to describe a smoothness or roughness of the surface of an object in the three-dimensional scene;

wherein the description of the smoothness or roughness of the surface of the object comprises a value that at least partially indicates whether a difference between a first surface normal of a first region of the object and a second surface normal of a second region of the object is within a threshold;

examining an indication to determine whether the attribute parameter set has been formed on the basis of visual properties of a surface of an object in the three-dimensional scene;

decoding the indication of whether the attribute parameter set has been formed on the basis of visual properties of the surface of the object at least partially from at least one syntax element that indicates that the attribute parameter set has been formed to describe the smoothness or roughness of the surface of the object; and in response to the examination revealing that the attribute parameter set has been formed on the basis of visual properties of the surface of the object, using the attribute parameter set to reconstruct the three-dimensional scene.

23. The method of claim 22, further comprising:

examining a range for which the attribute parameter set is valid.

24. The method of claim 22 further comprising:

receiving attribute values per block of pixels in each patch;

receiving the attribute values as a residual between a previous attribute value and a current attribute value;

receiving the attribute values as a residual between at least one previous attribute index value and at least one current attribute index value;

receiving the attribute values per a region of interest; or receiving the attribute values as indexes to a look-up table.

* * * * *